US010615468B2

United States Patent
Yoshida et al.

(10) Patent No.: US 10,615,468 B2
(45) Date of Patent: Apr. 7, 2020

(54) POWER STORAGE DEVICE

(71) Applicant: Mitsubishi Electric Corporation, Chiyoda-ku, Tokyo (JP)

(72) Inventors: Yukihiro Yoshida, Tokyo (JP); Yuruki Okada, Tokyo (JP); Sho Shiraga, Tokyo (JP); Tomoki Takegami, Tokyo (JP); Toshihiro Wada, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 173 days.

(21) Appl. No.: 15/571,662

(22) PCT Filed: May 27, 2015

(86) PCT No.: PCT/JP2015/065294
§ 371 (c)(1),
(2) Date: Nov. 3, 2017

(87) PCT Pub. No.: WO2016/189708
PCT Pub. Date: Dec. 1, 2016

(65) Prior Publication Data
US 2018/0151925 A1    May 31, 2018

(51) Int. Cl.
*H01M 10/617* (2014.01)
*H01M 10/48* (2006.01)
(Continued)

(52) U.S. Cl.
CPC ......... *H01M 10/617* (2015.04); *H01M 10/48* (2013.01); *H01M 10/488* (2013.01);
(Continued)

(58) Field of Classification Search
CPC ............ H01M 10/617; H01M 10/613; H01M 10/633; H01M 10/651; H01M 10/6557;
(Continued)

(56) References Cited

U.S. PATENT DOCUMENTS

2003/0087148 A1  5/2003  Minamiura
2007/0298316 A1* 12/2007  Yamamoto .......... H01M 10/425
                                                        429/62
(Continued)

FOREIGN PATENT DOCUMENTS

EP        2713433 A1    4/2014
JP     2003-142167 A    5/2003
(Continued)

OTHER PUBLICATIONS

International Search Report (PCT/ISA/210) dated Aug. 4, 2015, by the Japanese Patent Office as the International Searching Authority for International Application No. PCT/JP2015/065294.
(Continued)

*Primary Examiner* — Gregg Cantelmo
(74) *Attorney, Agent, or Firm* — Buchanan Ingersoll & Rooney PC

(57) ABSTRACT

Battery cells are disposed apart from each other in a housing of a battery module included in a power storage device. In the battery module, a partition member is provided that divides a space in the housing into a high temperature region, which contains battery cells located centrally in a disposal direction of the battery cells, and a low temperature region, which contains battery cells located at end portions in the disposal direction of the battery cells. The cooling air flow supplied from a fan passes between the battery cells in the high temperature region, passes through ventilation holes provided in the partition members, enters the low temperature region, passes between the battery cells in the low temperature region, passes through a discharge hole, and flows outside of the housing.

10 Claims, 25 Drawing Sheets

(51) Int. Cl.
| | |
|---|---|
| *H01M 10/633* | (2014.01) |
| *H01M 10/613* | (2014.01) |
| *H01M 10/6563* | (2014.01) |
| *H01M 10/651* | (2014.01) |
| *H01M 10/6565* | (2014.01) |
| *H01M 10/6566* | (2014.01) |
| *H01M 10/6557* | (2014.01) |
| *H01M 2/10* | (2006.01) |

(52) U.S. Cl.
CPC ....... *H01M 10/613* (2015.04); *H01M 10/633* (2015.04); *H01M 10/651* (2015.04); *H01M 10/6557* (2015.04); *H01M 10/6563* (2015.04); *H01M 10/6565* (2015.04); *H01M 10/6566* (2015.04); *H01M 2/1077* (2013.01); *H01M 2200/10* (2013.01)

(58) Field of Classification Search
CPC ......... H01M 10/6563; H01M 10/6565; H01M 10/6566; H01M 10/48; H01M 10/488; H01M 2/1077; H01M 2200/10
See application file for complete search history.

(56) References Cited

U.S. PATENT DOCUMENTS

| | | |
|---|---|---|
| 2011/0183179 A1 | 7/2011 | Okada |
| 2012/0009446 A1 | 1/2012 | Mizuguchi |
| 2012/0078437 A1 | 3/2012 | Stripf et al. |
| 2014/0095092 A1 | 4/2014 | Ikeda et al. |

FOREIGN PATENT DOCUMENTS

| | | |
|---|---|---|
| JP | 2004-281077 A | 10/2004 |
| JP | 2010-135075 A | 6/2010 |
| JP | 2010-225344 A | 10/2010 |
| JP | 5450128 B2 | 3/2014 |

OTHER PUBLICATIONS

Office Action dated Dec. 13, 2019, by the India Patent Office in corresponding India Patent Application No. 201747039908 and English translation of the Office Action (all references were previously cited on Jan. 6, 2020). (5 pages).

* cited by examiner

POWER STORAGE DEVICE

TECHNICAL FIELD

The present disclosure relates to a power storage device.

BACKGROUND ART

Batteries are easily affected by temperature, batteries degrade at high temperatures, and battery performance cannot be realized at low temperatures. In the case of a module formed by combining multiple battery cells, due to self-generated heat from a battery during use, the degree of heat dissipation differs in accordance with position of the battery cell in the module, and a deviation occurs in the temperature distribution of the module. The battery is cooled by cooling air flow to decrease the deviation of the temperature distribution, and the deviation of the temperature distribution of the module is reduced.

A power supply device disclosed in Patent Literature 1 decreases the deviation of the temperature distribution by cooling the battery cells by blowing a coolant gas through a cooling gap from a side surface of a battery block, and by providing a temperature equalization plate partially blocking an opening of the cooling gap such that an amount of coolant gas flowing in the cooling gap decreases with increasingly far position of the battery cell in an upstream direction of the flow of the coolant gas.

CITATION LIST

Patent Literature

Patent Literature 1: Japanese Patent No. 5450128

SUMMARY OF INVENTION

Technical Problem

The temperature distribution of the power supply device disclosed in Patent Literature 1 is wide, and even in the case in which batteries at high temperature need to be cooled and batteries at low temperature need to be warmed, this wide temperature distribution results in cooling of the batteries at low temperature. Thus this power supply device may be unable to sufficiently decrease the deviation of the temperature distribution.

The present disclosure is developed in consideration of the aforementioned circumstances, and an object of the present disclosure is to further decrease the deviation of the temperature distribution of battery cells.

Solution to Problem

In order to attain the aforementioned objective, the power storage device of the present disclosure includes a battery module including a housing, battery cells disposed apart from each other within the housing, a partition member dividing a space within the housing into a high temperature region and a low temperature region, a fan, and an adjuster. In the high temperature region, the included battery cells are, among the battery cells, those battery cells that are located centrally in an arrangement direction. In the low temperature region, the included battery cells are, among the battery cells, those battery cells that are located in end portions in the arrangement direction. The fan supplies cooling air flow to the high temperature region. The adjuster adjusts an amount of the cooling air flow by controlling the fan in response to a value indicating a degree of deviation of a temperature distribution of the battery cells. The partition member has ventilation holes to allow the cooling air flow supplied from the fan to the high temperature region to pass between the battery cells located in the high temperature region and enter the low temperature region. The housing has discharge holes to allow the cooling air flow flowing into the low temperature region from the ventilation holes to pass between the battery cells located in the low temperature and flow out to the exterior of the housing. The housing has central discharge holes to allow the cooling air flow supplied from the fan to the high temperature region and passing between the battery cells located in the high temperature region to flow to the exterior of the housing. The power storage device further includes a valve to adjust the amount of the cooling air flow passing through each of the ventilation holes and the central discharge holes and flowing out of the high temperature region. The adjuster controls the valve in response to a value corresponding to a minimum temperature of the battery cells.

Advantageous Effects of Invention

According to the present disclosure, the cooling air flow passing through the high temperature region containing the battery cells located centrally in the arrangement direction passes through the low temperature region containing the battery cells located in the end portions in the arrangement direction, and then the cooling air flow flows out to the exterior of the housing, and thus further decrease of deviation of the temperature distribution of the battery cells is enabled.

DESCRIPTION OF EMBODIMENTS

Embodiments of the present disclosure are described below in detail in reference to figures. In the figures, components that are the same or equivalent are assigned the same reference signs.

Embodiment 1

Figure 1:
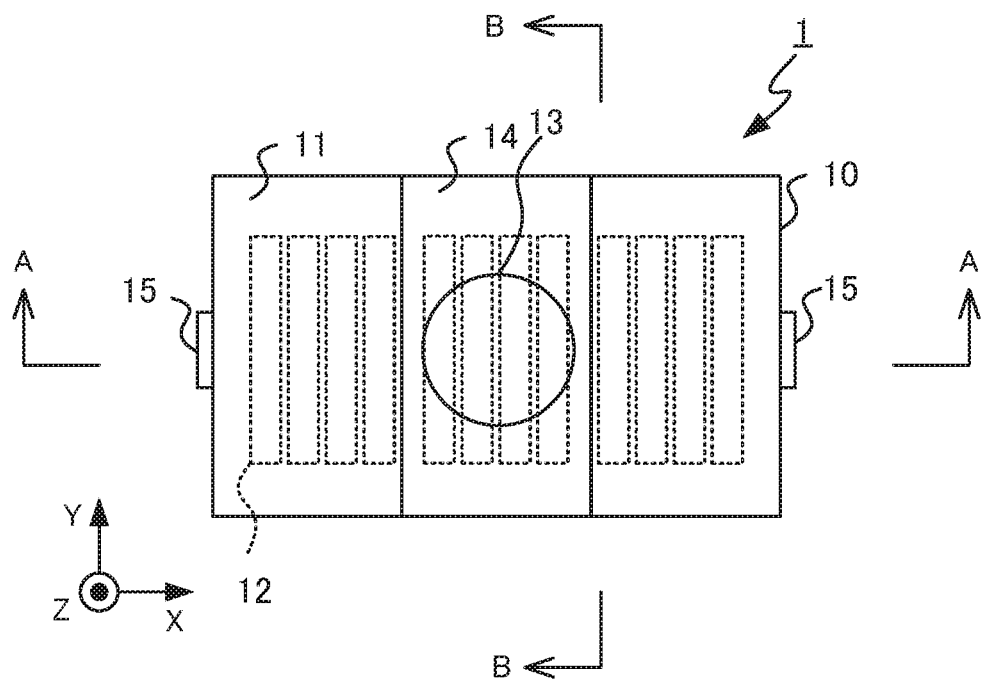
FIG. 1 is a top view of a battery module according to Embodiment 1 of the present disclosure.
Figure 2:
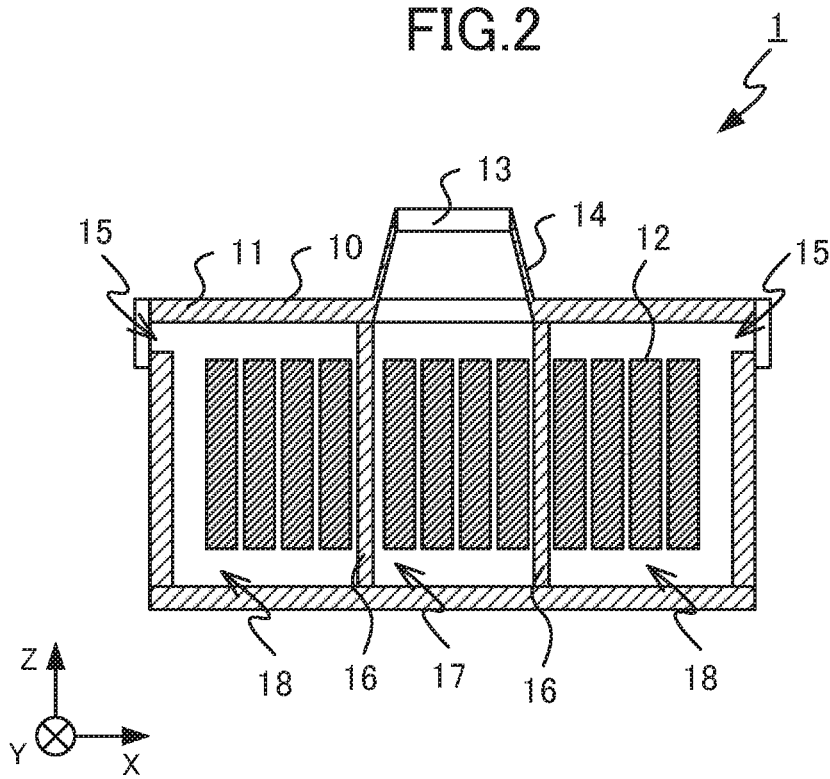
FIG. 2 is a cross-sectional view of the battery module according to Embodiment 1.
Figure 3:
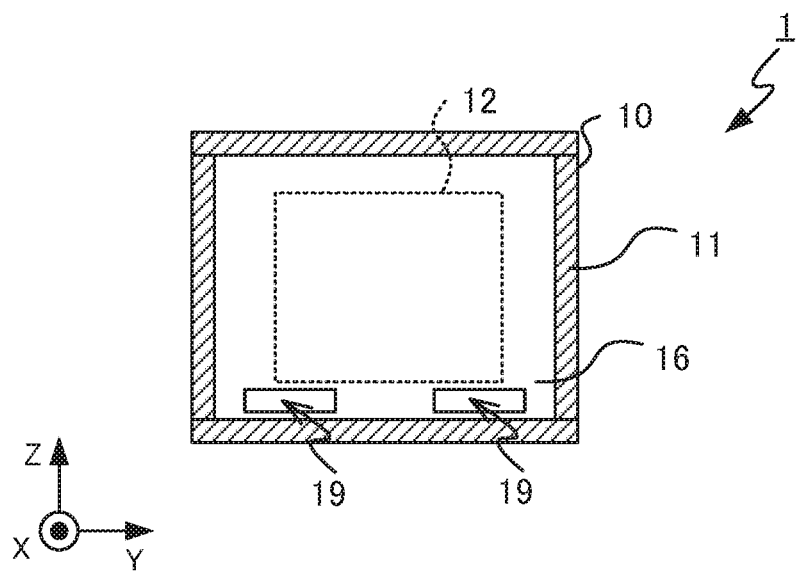
FIG. 3 is a cross-sectional view of the battery module according to Embodiment 1.

FIG. 1 is a top view of a battery module according to Embodiment 1 of the present disclosure. A power storage device 1 according to Embodiment 1 includes a battery module 10, stores power supplied from a generator, for example, and supplies the stored power to an electric motor. FIG. 2 and FIG. 3 are cross-sectional views of the battery module according to Embodiment 1. FIG. 2 is a cross-sectional view taken along line A-A of the battery module 10 illustrated in FIG. 1, and FIG. 3 is a cross-sectional view taken along line B-B of the battery module 10 illustrated in FIG. 1. Within a housing 11 of the battery module 10, battery cells 12 are disposed apart from each other. In the example of FIG. 1, the direction of disposal of the battery cells 12 is taken to be the X axis direction. In an upper surface of the housing 11 of the battery module 10 illustrated in FIG. 1, the Y axis direction is taken to be the direction perpendicular to the X axis direction. The direction perpendicular to the X axis direction and the Y axis direction is taken to be the Z axis direction.

In the battery module 10, partition members 16 are provided that divide a space within the housing 11 into:

a high temperature region 17 containing, among the battery cells 12, the battery cells 12 located centrally in the X axis direction, and a low temperature region 18 containing, among the battery cells 12, the battery cells 12 located at end portions in the X axis direction.

Two partition members 16 are provided in the example of FIG. 1. Ventilation holes 19 are provided in the partition members 16. Two ventilation holes 19 in each of the partition member 16 are provided at positions near a bottom surface of the housing 11 in the partition members 16 so that cooling air flow supplied to the high temperature region 17 from a fan 13 passes between the battery cells 12 and enters the low temperature region 18 through the air holes 19. Discharge holes 15 are provided in the housing 11. In surfaces of the housing 11 perpendicular to the X axis direction, two discharge holes 15 are provided at locations near an upper surface of the housing 11 so that the cooling air flow entering the low temperature region 18 passes between the battery cells 12 and then flows out to the exterior of the housing 11 through the discharge holes 15.

Figure 4:
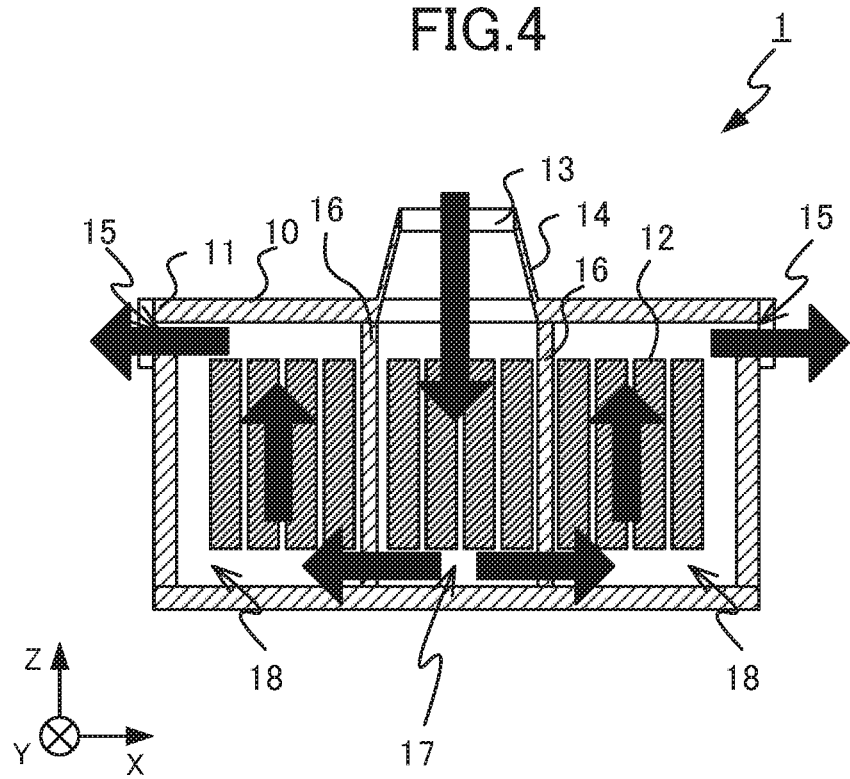
FIG. 4 is a drawing illustrating cooling air flow in the battery module according to Embodiment 1.

FIG. 4 is a drawing illustrating cooling air flow in the battery module according to Embodiment 1. In FIG. 4, black arrows indicate cooling air flow in the cross-sectional drawing of the battery module 10. The cooling air flow supplied to the high temperature region 17 through a duct 14 from the fan 13 passes between the battery cells 12 located within the high temperature region 17, passes through the ventilation holes 19, and flows into the low temperature region 18. The cooling air flow flowing into the low temperature region 18 through the ventilation holes 19 passes between the battery cells 12 located within the low temperature region 18 and flows out to the exterior of the housing 11 through the discharge holes 15. After exchanging heat with the battery cells 12 located within the high temperature region 17, the cooling air flow enters the low temperature region 18, and thus temperature of the cooling air flow when entering the low temperature region 18 is higher than the temperature of the cooling air flow when supplied from the fan 13 to the high temperature region 17. Due to the cooling air flow passing through the high temperature region 17 being made to flow into the low temperature region 18, the deviation of the temperature distribution of the battery cells 12 in the battery module 10 decreases.

In the example of FIG. 1, twelve battery cells 12 are contained in the battery module 10, four centrally located battery cells 12 are included in the high temperature region 17, and the remaining battery cells 12 are included in the low temperature region 18. However, the number of battery cells 12 included in the battery module 10, the number of battery cells 12 included in the high temperature region 17, and the number of battery cells 12 included in the low temperature region 18 are freely selected.

Figure 5:
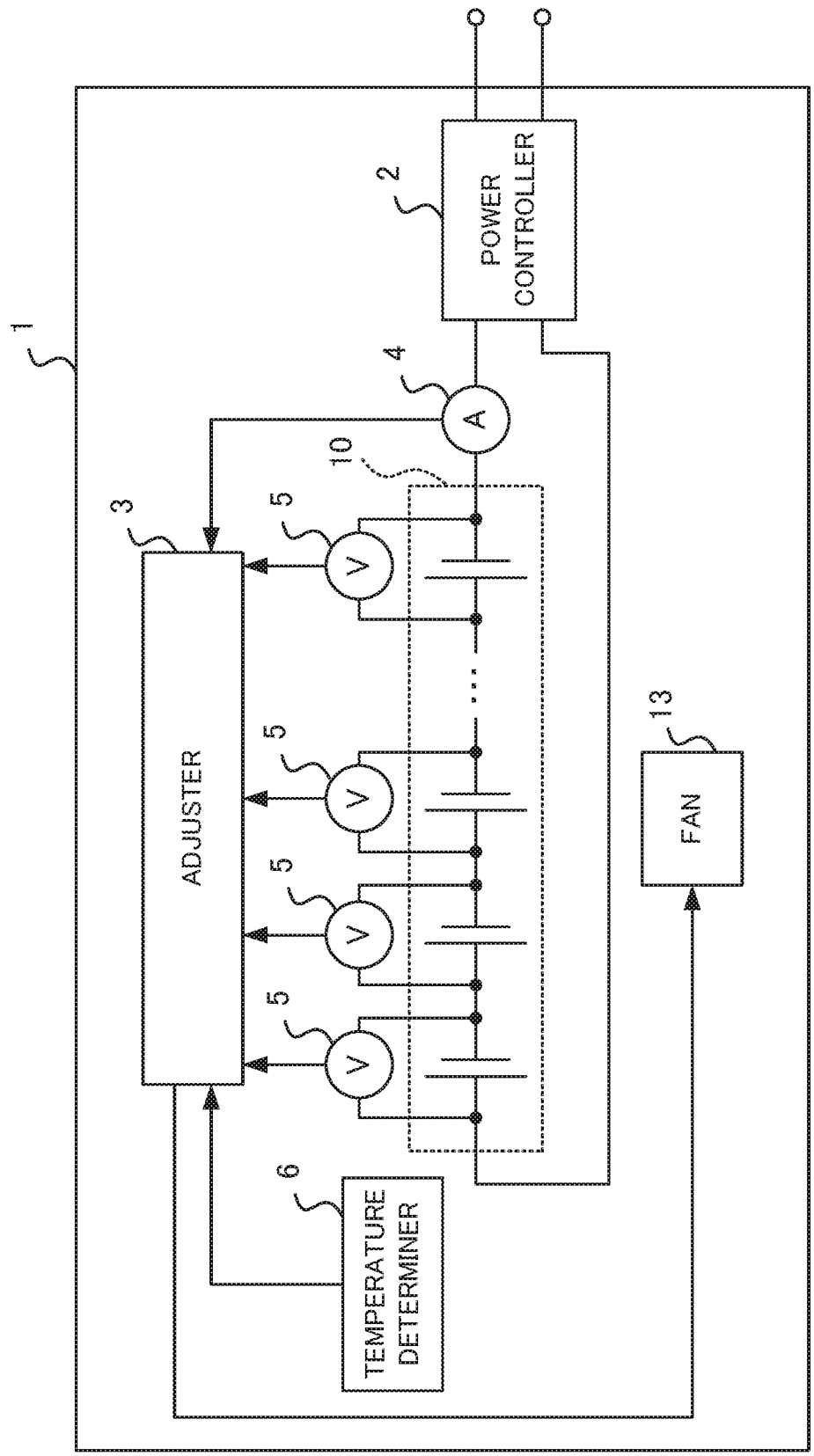
FIG. 5 is a block diagram illustrating a configuration example of a power storage device according to Embodiment 1.

In order to further decrease the deviation of the temperature distribution, the power storage device 1 may have a function for controlling the fan 13 in accordance with a value indicating degree of the deviation of the temperature distribution of the battery cells 12. FIG. 5 is a block diagram illustrating a configuration example of the power storage device according to Embodiment 1. The power storage device 1 includes: a power controller 2 for converting the power supplied from a power generator as required for supply to the battery module 10, and for converting the power stored in the battery module 10 as required for supply to the power generator, and an adjuster 3 for adjusting a quantity of cooling air flow by controlling the fan 13 in accordance with a value indicating a degree of the deviation of the temperature distribution of the battery cells 12. In the example of FIG. 5, the power storage device 1 includes a current detector 4 for detection of current flowing through the battery module 10, a voltage detector 5 for detection of voltage of each of the battery cells 12, and a temperature determiner 6 for measurement of temperature of each of the battery cells 12. The temperature determiner 6 has a temperature sensor such as a thermocouple, for example.

The value indicating the degree of deviation of the temperature distribution is described below. The value indicating the degree of deviation of the temperature distribution, for example, is a difference between a maximum value and a minimum value of temperature of the battery cells 12, a temperature variance of the battery cells 12, or the like. The adjuster 3, for example, on the basis of the temperature of each of the battery cells 12 measured by the temperature determiner 6, calculates the value indicating the degree of deviation of the temperature distribution.

Alternatively, for example, without providing the power storage device 1 with the temperature determiner 6, the adjuster 3 calculates internal resistances of the battery cells 12 from the current detected by the current detector 4 and the voltage detected by the voltage detector 5, estimates the temperatures of the battery cells 12 from the calculated internal resistances, and calculates, on the basis of the estimated temperatures of each of the battery cells 12, the value indicating the degree of deviation of the temperature distribution. In this case, the adjuster 3 functions as an internal resistance calculator and a temperature estimator. In the calculation of the internal resistance, a formula is used such as the below Formula (1) as prescribed in JIS standard (JIS C8715-1). In the below Formula (1), $R_{dc}$ is direct current resistance in ohm ($\Omega$) units, $I_1$ and $I_2$ are discharge current values in ampere (A) units, and $U_1$ and $U_2$ are voltages measured during discharge in volt (V) units.

[Formula 1]

$$R_{dc} = \frac{U_1 - U_2}{I_2 - I_1} \quad (1)$$

Figure 6:
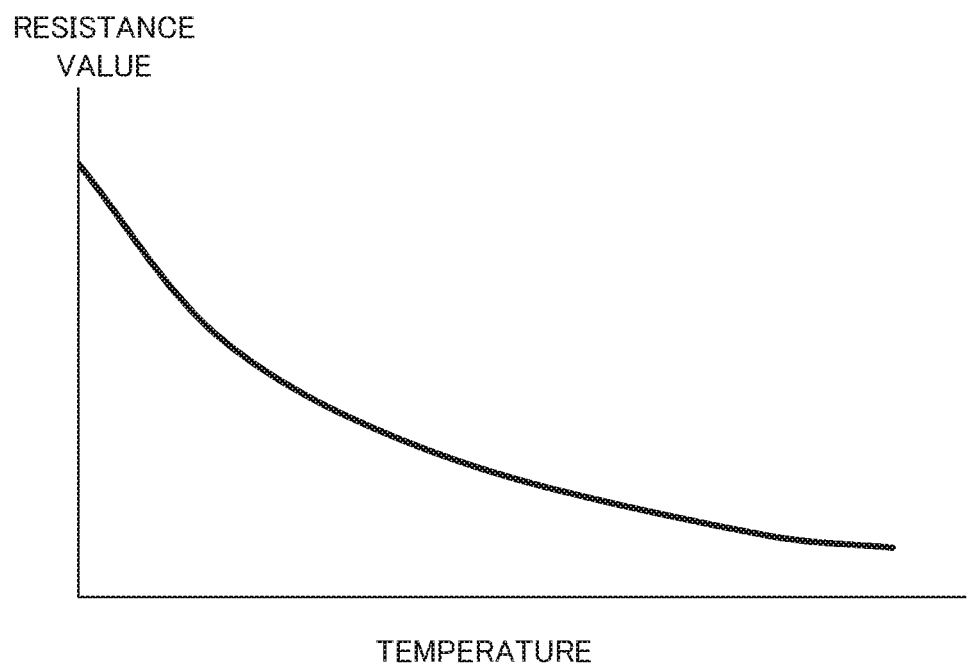
FIG. 6 is a drawing illustrating an example of a relationship between internal resistance and battery temperature in the battery module according to Embodiment 1.

The internal resistance of the battery cell 12 calculated in the aforementioned manner has a correlation with the temperature of the battery cell 12. FIG. 6 is a drawing illustrating an example of a relationship between the internal resistance and the battery temperature in battery module according to Embodiment 1. In FIG. 6, the horizontal axis indicates the temperature, and the vertical axis indicates a resistance value of the internal resistance. The adjuster 3 retains beforehand the relationship between the internal resistance and the temperature illustrated in FIG. 6. From the internal resistances calculated using the aforementioned Formula (1) and the predetermined relationship between the internal resistance and the temperature illustrated in FIG. 6, the adjuster 3 can estimate the temperatures of the battery cells 12, and can calculate, on the basis of the estimated temperatures, the value indicating the degree of deviation of the temperature distribution.

Whether the measured temperature or the estimated temperature of the battery cell 12 is used, using the temperatures of all the battery cells 12 is not required during the calculation of the value indicating the degree of deviation of the temperature distribution. The value indicating the degree of deviation of the temperature distribution may be determined on the basis of the temperatures of a portion of the battery cells 12 located in the high temperature region 17 and a portion of the battery cells 12 located the low temperature region 18, the portion of the battery cells 12 contained in the high temperature region and the portion of the battery cells contained in the low temperature region being determined in response to the temperature distribution during natural cooling. Here, the expression "natural cooling" means cooling without the performance of cooling of the battery module 10 by the fan 13 or the like. For example, the value indicating the degree of deviation of the temperature distribution may be determined on the basis of the temperatures of two battery cells 12 having the maximum temperature during natural cooling and located centrally in the X axis direction, and the temperatures of two battery cells 12 having the minimum temperature during natural cooling and located at both ends in the X axis direction.

Control of the fan 13 performed by the adjuster 3, in response to the aforementioned value indicating the degree of deviation of the temperature distribution, is described below. In the case in which the value Td indicating the degree of deviation of the temperature distribution is greater than or equal to a first threshold T1, or in the case in which a value Th corresponding to the maximum temperature of the battery cells 12 is greater than or equal to a second threshold T2, the adjuster 3 causes the fan 13 to operate. T1, for example, may be determined in response to a permissible range of a difference in resistance values in the battery cells 12 on the basis of the relationship between the temperature and the internal resistance of the battery cells 12, or may be determined in response to a relationship between temperature of the battery cell 12 and service life of the battery cell 12. The temperature T2 can be determined in response to a certain temperature at which deterioration of the battery cell 12 may occur due to, when the temperature of the battery cell 12 is greater than or equal to the temperature T2, occurrence of side reactions that are not the normal reactions desired for the battery cell 12 to function as a battery. T2 can be determined on the basis of design information, evaluation testing, or the like.

In the case in which, after operation of the fan 13, a value Tc corresponding to the minimum value of the temperatures of the battery cells 12 is greater than or equal to a third threshold T3, Td is less than T1, and Th is less than T2, the adjuster 3 then stops the fan 13. T3 is determined in response to the temperature at which the input-output performance desired for the battery module 10, from the relationship between the temperature and the internal resistance of the battery cell 12, can be achieved when the temperature of the battery cell 12 is greater than or equal to T3.

In the case in which the temperature determiner 6 measures the temperatures of each of the battery cells 12 or in the case in which the adjuster 3 estimates the temperatures of each of the battery cells 12, Th is the maximum value of the measured temperatures or the estimated temperatures of the battery cells 12, and Tc is the minimum value of the measured temperatures or the estimated temperatures of the battery cells 12. In the case in which Td is determined by the temperatures of a portion of the battery cells 12 determined in response to the temperature distribution during natural cooling, Th is taken to be the temperature of the battery cells 12 located in the high temperature region 17, and Tc is taken to be the temperature of the battery cells 12 located in the low temperature region 18.

By causing the fan 13 to operate in the case in which Td is greater than or equal to T1 or in the case in which Th is greater than or equal to T2, the deviation of the temperature distribution of the battery module 10 decreases, the high temperature-induced deterioration of the battery cells 12 can be suppressed. After the startup of the fan 13, operation of the fan 13 continues during the time period in which Tc is less than T3, the cooling air flow passing through the high temperature region 17 is made to flow into the low temperature region 18, thus enabling increase of the temperature of the battery cells 12 located within the low temperature region 18. Thereafter when Tc is greater than or equal to T3, and Td is less than T1 and Th is less than T2, the deviation of the temperature distribution of the battery module 10 is within the permissible range, the temperatures can be considered to enable the achievement of the input-output performance desired for the battery module 10, and thus the adjuster 3 causes the fan 13 to stop. T1 and T2 may have hysteresis characteristics.

Figure 7:
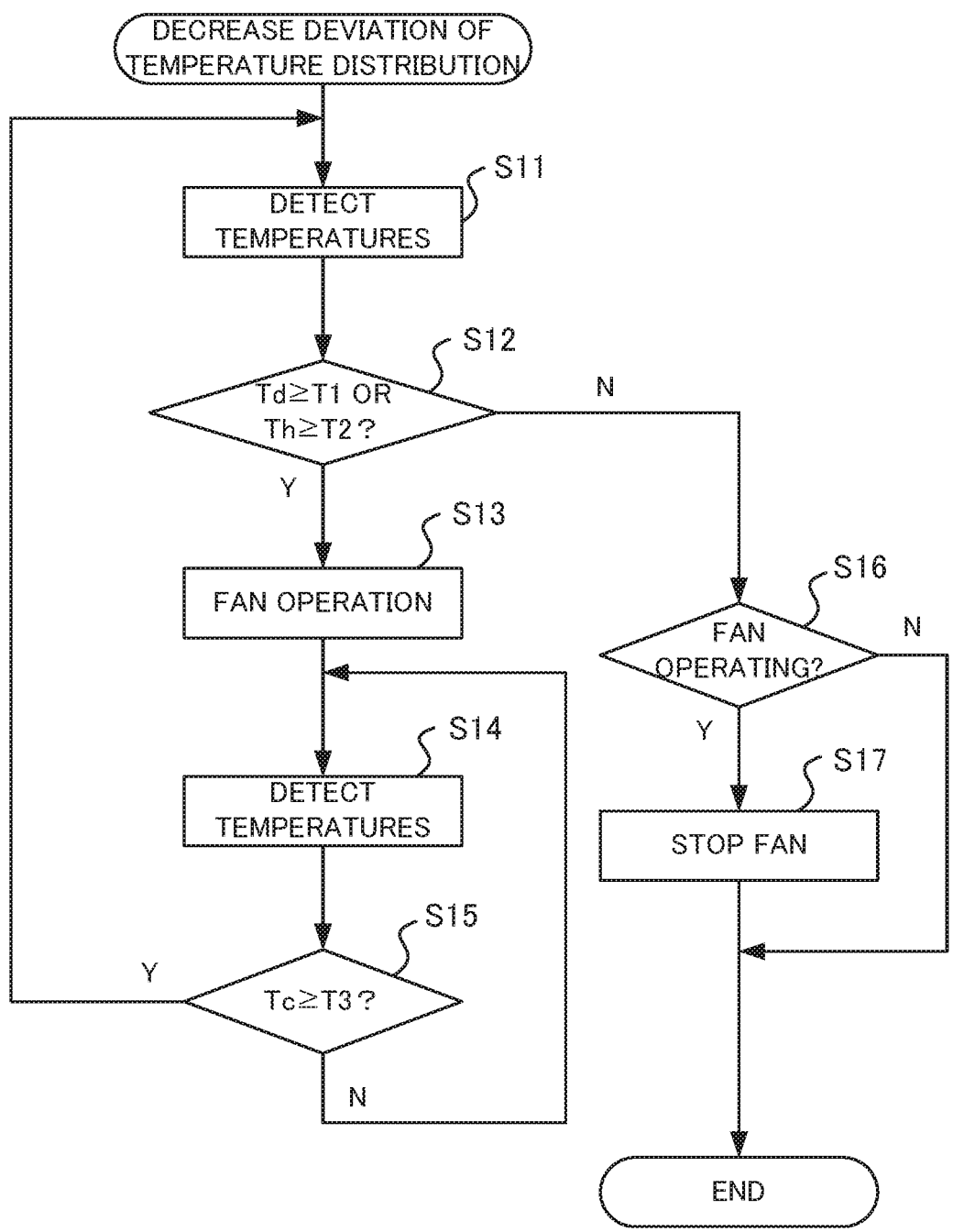
FIG. 7 is a flow chart illustrating an example of operation, performed by the power storage device according to Embodiment 1, to decrease a deviation of a temperature distribution.

FIG. 7 is a flow chart illustrating an example of operation, performed by the power storage device according to Embodiment 1, to decrease the deviation of the temperature distribution. The power storage device 1 detects the temperatures of the battery cells 12 (step S11). In the aforementioned manner, the processing of step S11 may be the measurement of the temperature of the battery cells 12 by the temperature determiner 6, or may be the estimation of the temperature of the battery cells 12 by the adjuster 3. In the case in which Td is greater than or equal to T1, or Th is greater than or equal to T2 (Y in step S12), the adjuster 3 causes operation of the fan 13 (step S13). The power storage device 1 detects the temperature of the battery cells 12 in the same manner as in step S11 (step S14). In the case in which Tc is not greater than or equal to T3 (N in step S15), processing returns to step S14, and the aforementioned processing repeats. In the case in which, after continuation of operation of the fan 13, Tc is greater than or equal to T3 (Y in step S15), processing returns to step S11, temperature is detected, and the determination processing of step S12 is performed. In the case in which Td is less than T1, and Th is less than T2 (N in step S12), when the fan 13 is in operation (Y in step S16), the fan 13 is stopped (step S17), and processing ends. In the case in which Td is less than T1 and Th is less than T2 (N in step S12), when the fan 13 is not in operation (N in step S16), processing ends without any performance of a step. The time interval at which the power storage device 1 repeatedly performs the processing to decrease the deviation of the temperature distribution illustrated in FIG. 7 is freely determined.

Figure 8:
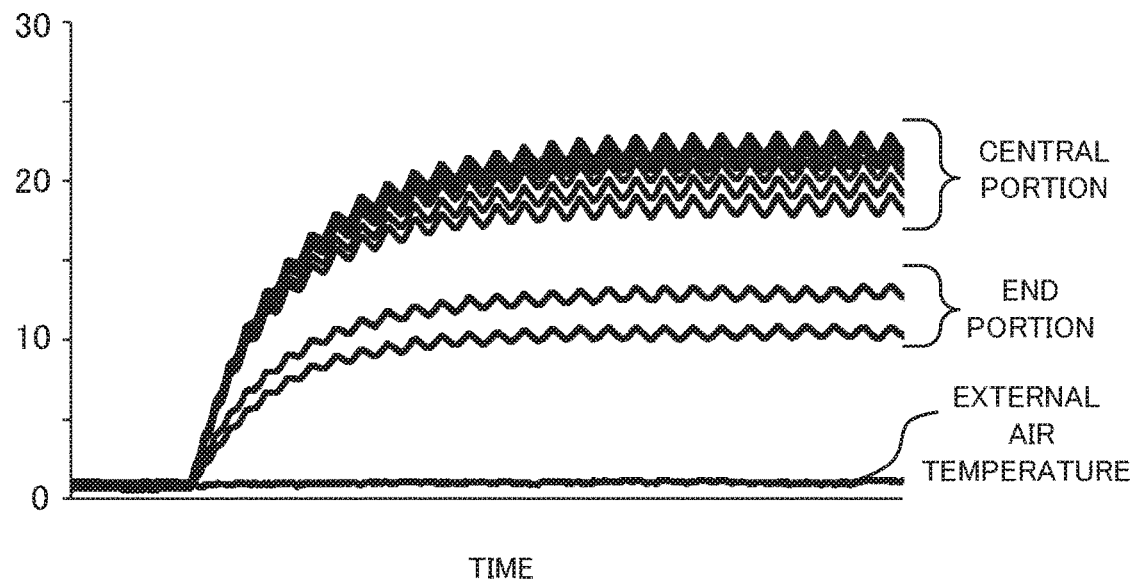
FIG. 8 is a drawing illustrating temperature changes of a battery module during natural cooling.

For the battery module 10 having twelve battery cells 12 disposed along the X axis direction as illustrated in FIG. 1, an example is illustrated of measurement results of the temperature of each of the battery cells 12 when charging and discharging are repeated at a fixed current value. FIG. 8 is a drawing illustrating temperature changes of the battery module during natural cooling. In FIG. 8, the horizontal axis indicates time, and the vertical axis indicates temperature. FIG. 8 illustrates a measured surface temperature of each of the battery cells 12 and an external air temperature. In the case of a low external air temperature as illustrated in FIG. 8, when the repeatedly charging and discharging battery module 10 was naturally cooled, charging and discharging caused self-heating of the battery cells 12, and the temperature of each battery cell 12 of the battery module 10 increased. In the case of natural cooling of the battery module 10, the heat dissipation amount of the battery cells 12 located at the end portions in the X axis direction was greater than the heat dissipation amount of the battery cells 12 located centrally in the X axis direction. Thus as illustrated in FIG. 8, the temperatures of the battery cells 12 located at a central portion in the X axis direction became higher than the temperatures of the battery cells 12 located at the end portions in the X axis direction. In the example of FIG. 8, the temperature difference between the battery cells 12 of the central portion and the end portions was about 13 degrees. In the battery cells 12 used for the measurements, a resistance value difference of 1 mΩ occurred due to the 13 degree temperature difference. In this case, a voltage difference of about 0.05 V occurred when charging and discharging were done at 50 A. For example, when an upper limit voltage of each battery cell 12 is set at 4.2 V, even though the voltage of the battery cells 12 at the end portions having high internal resistance due to low temperature reaches 4.2 V, the voltage of the battery cells 12 at the central portion reaches no more than 4.15 V. Thus utilization efficiency of the battery cells 12 in the central portion of the battery module 10 is lower than the utilization efficiency of the battery cells 12 in the end portions.

Figure 9:
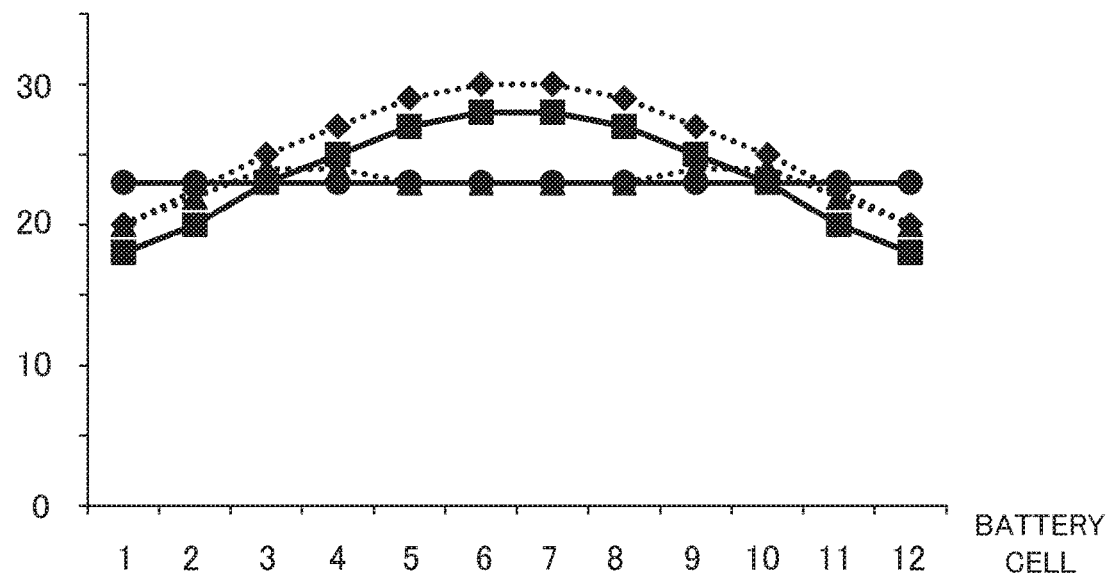
FIG. 9 is a drawing illustrating an example of the temperature distribution of the battery module.

FIG. 9 is a drawing illustrating an example of the temperature distribution of the battery module. In FIG. 9, each battery cell 12 is indicated along the horizontal axis, and the vertical axis indicates the temperature of each battery cell 12. The value of the horizontal axis of FIG. 9 indicates the location of the battery cell 12 in the battery module 10 illustrated in FIG. 1, in order from the left end. That is to say, the battery cell 12-15 farthest to the left end in the battery module 10 illustrated in FIG. 1 corresponds to "1" on the horizontal axis in FIG. 9.

In the case of natural cooling of the battery module 10, the graph is plotted in FIG. 9 as a dotted line using diamond-shaped points. In the case of supply of cooling air flow uniformly to each of the battery cells 12 from the side face of the battery module 10 perpendicular to the Y axis, the graph is plotted in FIG. 9 as the solid line using square-shaped points. In the case of supply of cooling air flow to the battery cells 12 located centrally in the X axis direction from the side face of the battery module 10 perpendicular to the Y axis, the graph is plotted in FIG. 9 as the dotted line using triangle-shaped points. In the case of the power storage device 1 according to Embodiment 1, the graph is plotted in FIG. 9 as the solid line using circular points.

When the battery module 10 was naturally cooled, a deviation of the temperature distribution occurred as illustrated in FIG. 9. When the cooling air flow was supplied uniformly to the battery cells 12, although there was an overall decrease in the temperatures of the battery cells 12, the generated deviation of the temperature distribution remained as is. In the case of supplying the cooling air flow to a portion of the battery cells 12 located centrally in the X axis direction, although there was a decrease of the deviation of the temperature distribution, a temperature difference occurred between the battery cells 12 located between the central and the end portions in the X axis direction, and the battery cells 12 located at the end portions in the X axis direction. In the power storage device 1 according to Embodiment 1, the deviation of the temperature distribution of the battery cells 12 occurring in the battery module 10 is understood to have been decreased by the cooling air flow supplied from the fan 13 passing through the high temperature region 17 and then entering the low temperature region 18.

As described above, the power storage device 1 according to Embodiment 1 enabled the decrease of the deviation of the temperature distribution of the battery cells 12 in the battery module 10 by causing the cooling air flow passing through the high temperature region 17 to pass through the low temperature region 18 and flow to the exterior of the housing 11.

Embodiment 2

Figure 10:
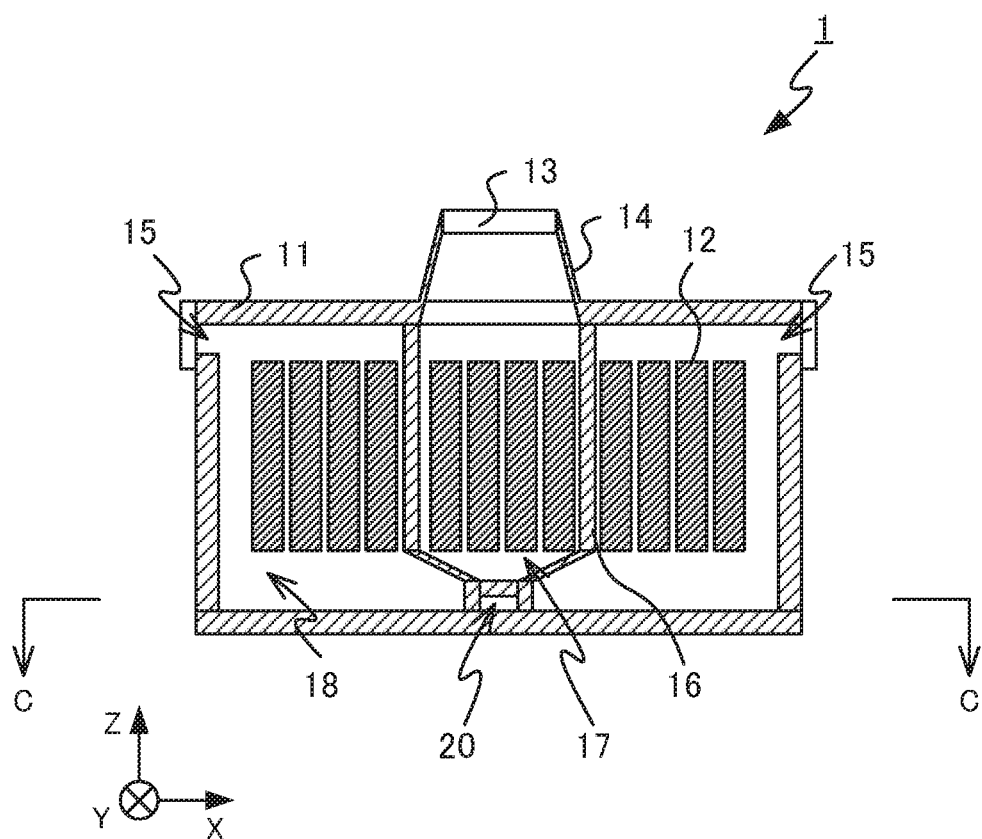
FIG. 10 is a cross-sectional view of a battery module according of Embodiment 2 of the present disclosure.
Figure 11:
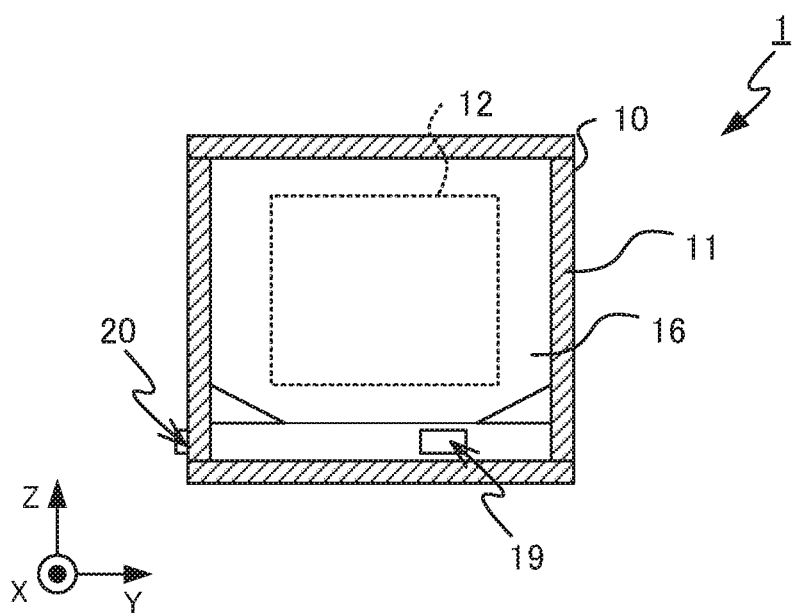
FIG. 11 is a cross-sectional view of the battery module according of Embodiment 2.

A top view of the battery module 10 according to Embodiment 2 is similar to that of FIG. 1. FIG. 10 and FIG. 11 are cross-sectional views of the battery module according to Embodiment 2 of the present disclosure. FIG. 10 is a cross-sectional view taken along line A-A of the battery module 10 illustrated in FIG. 1, and FIG. 11 is a cross-sectional view taken along line B-B of the battery module 10 illustrated in FIG. 1. A central discharge hole 20 is provided in the housing 11 in the battery module 10 according to Embodiment 2. The central discharge hole 20 is provided in the vicinity of the bottom surface of the housing 11 in a surface of the housing 11 perpendicular to the Y axis direction so that, after the cooling air flow supplied from the fan 13 to the high temperature region 17 passes between the battery cells 12, the cooling air flow then flows out to the exterior of the housing 11. In Embodiment 2, one ventilation hole 19 is provided in the surface of each partition member 16 perpendicular to the X axis direction in the vicinity of the bottom surface of the housing 11. The battery module 10 is provided with a below described valve for adjustment of the air flow amount of cooling air flow passing through each of the ventilation holes 19 and the central discharge hole 20 and then flowing out from the high temperature region 17. The adjuster 13 controls the valve in response to Tc.

Figure 12:
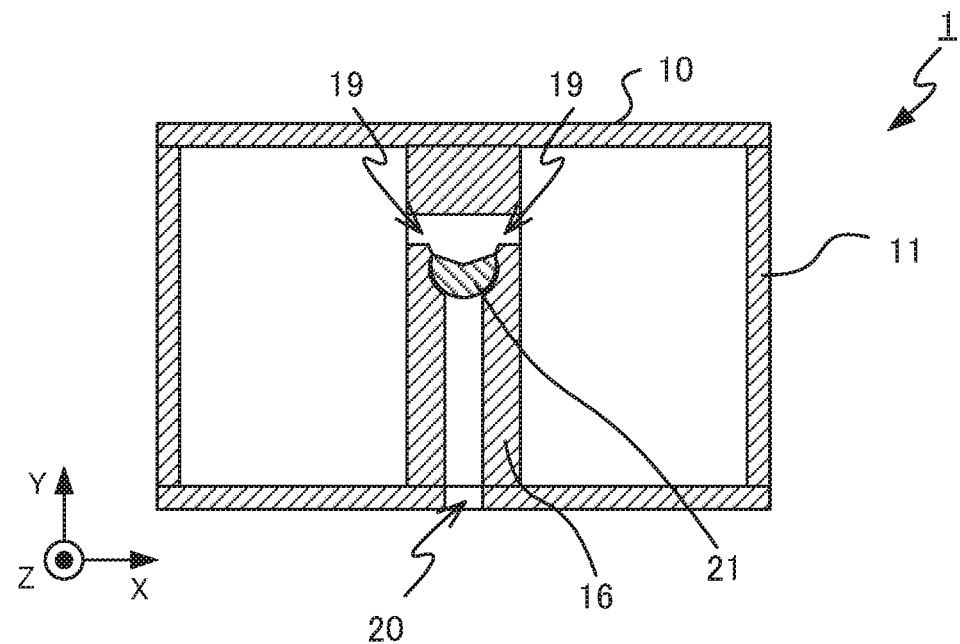
FIG. 12 is a drawing illustrating an example of structure of a valve according to Embodiment 2.
Figure 13:
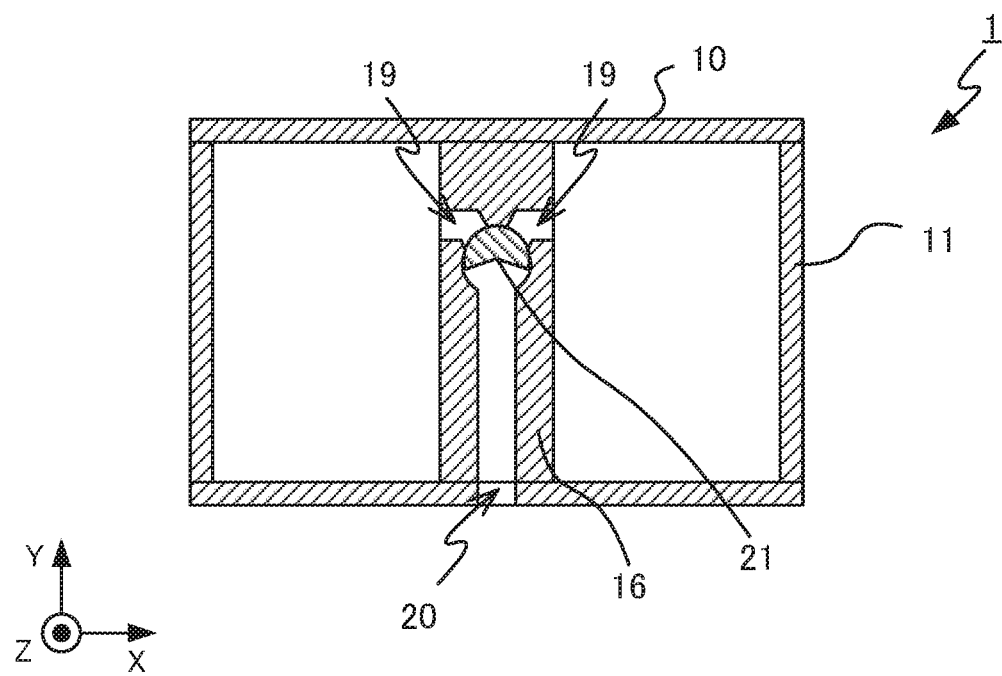
FIG. 13 is a drawing illustrating an example of the structure of the valve according to Embodiment 2.

FIG. 12 and FIG. 13 are drawings illustrating an example of the structure of the valve according to Embodiment 2. The valve 21 switches flow routes of the cooling air flow. The X-Y cross-sectional shape of the valve 21 is a circle missing a portion thereof, and the valve 21 rotates around an axis in the Z axis direction. FIG. 12 illustrates the position of the valve 21 in the case of allowing the cooling air flow to flow from the high temperature region 17 to the low temperature region 18, and FIG. 13 illustrates the position of the valve 21 in the case of allowing the cooling air flow to flow from the high temperature region 17 to the exterior of the housing 11.

Figure 14:
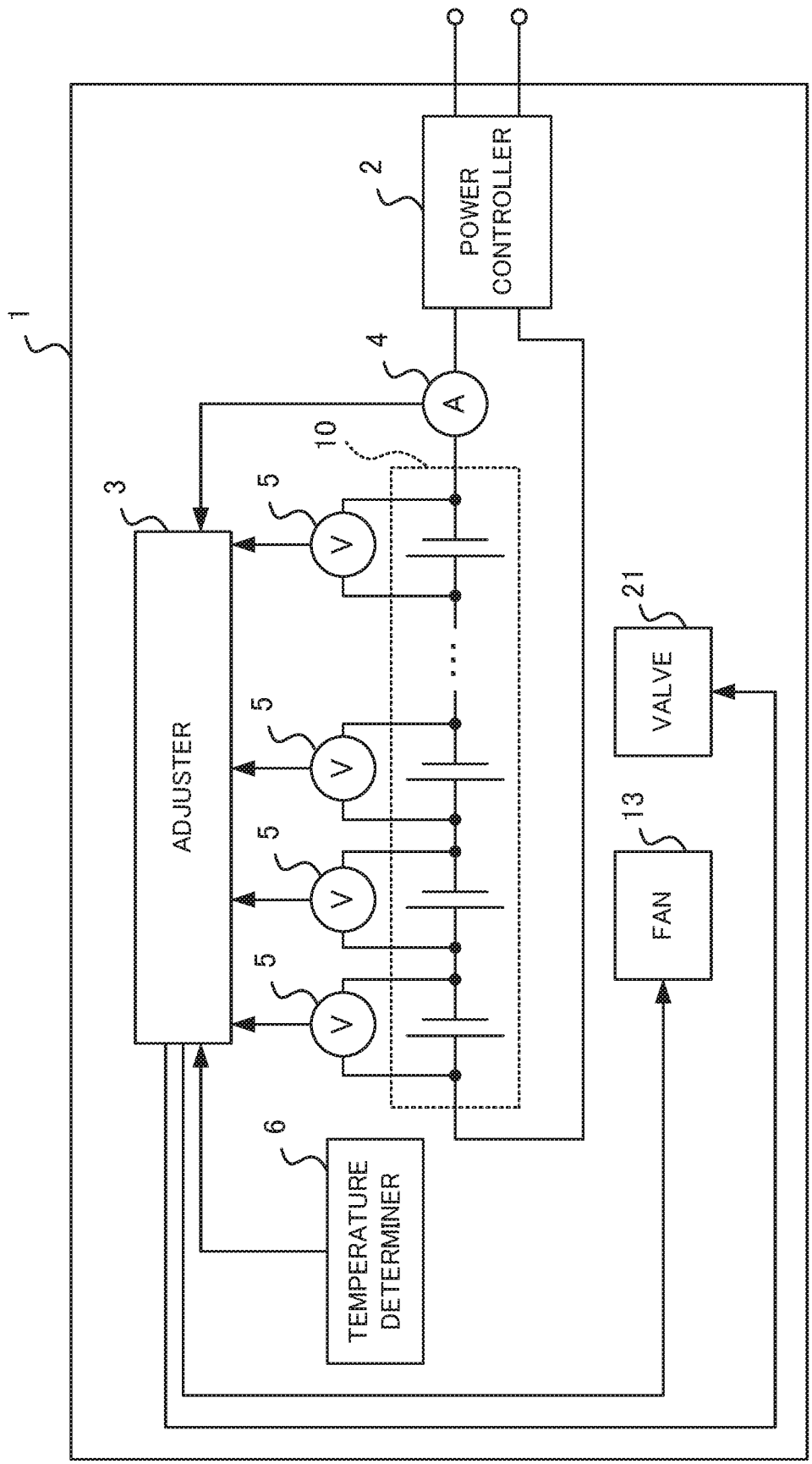
FIG. 14 is a block diagram illustrating a configuration example of the battery module according to Embodiment 2.

FIG. 14 is a block diagram illustrating a configuration example of the battery module according to Embodiment 2. The adjuster 3 controls the fan 13 and the valve 21. The adjuster 3 controls the fan 13 in the same manner as in Embodiment 1. After operation of the fan 13, the adjuster 3 controls the valve 21 in response to Tc. After operation of the fan 13, during the time period in which Tc is less than T3, the adjuster 3 controls the valve 21 as illustrated in FIG. 12 so as to cause the cooling air flow to enter the low temperature region 18 from the high temperature region 17. After operation of the fan 13, when Tc is greater than or equal to T3, the adjuster 3 controls the valve 21 as illustrated in FIG. 13 such that the cooling air flow from the high temperature region 17 flows out to the exterior of the housing 11.

In the case in which Tc is greater than or equal to T3, the cooling air flow having exchanged heat with the battery cells 12 in the high temperature region 17 is made to flow to the exterior of the housing 11, and thus the rise in temperature of the battery cells 12 within the low temperature region 18 above the desired temperature can be suppressed.

Figure 15:
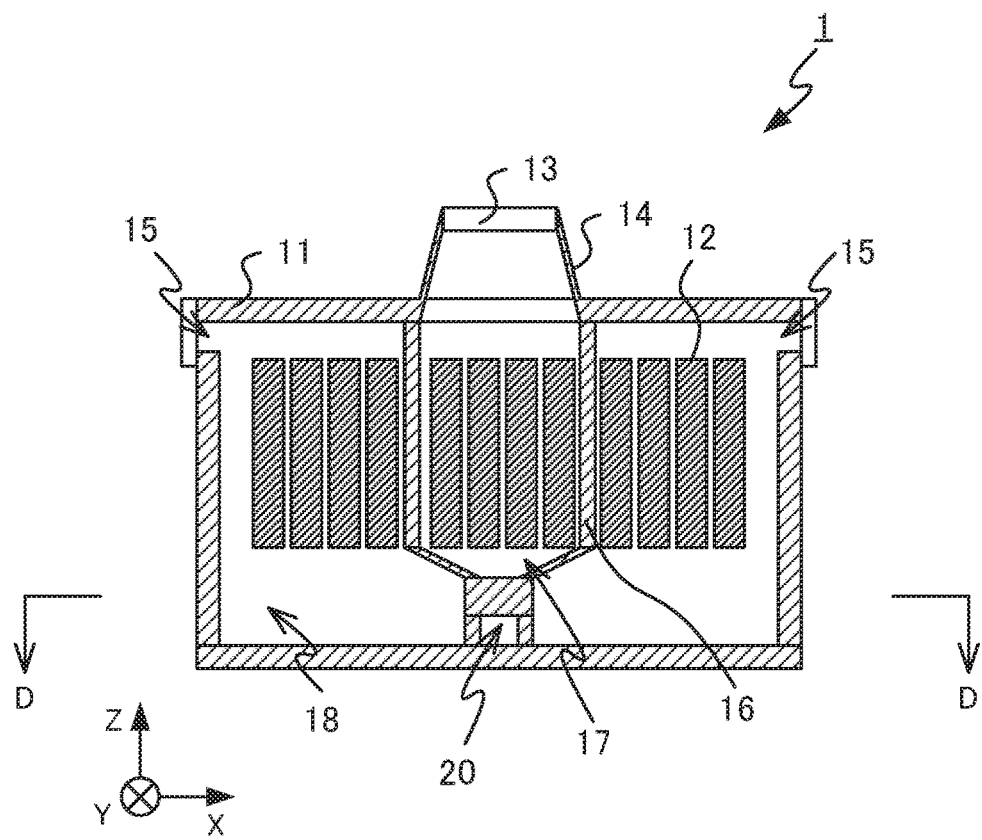
FIG. 15 is a cross-sectional view of the battery module according to Embodiment 2.
Figure 16:
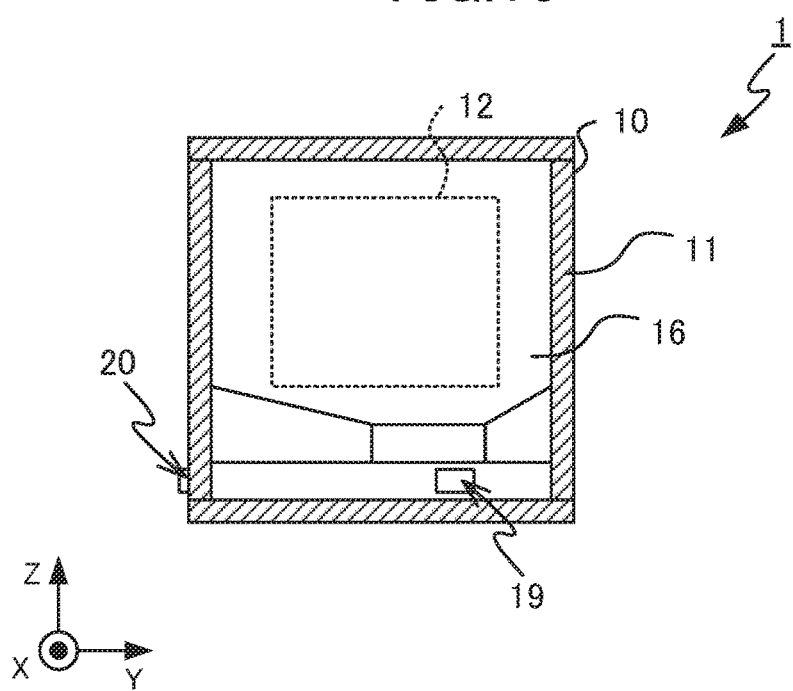
FIG. 16 is a cross-sectional view of the battery module according to Embodiment 2.

The battery module 10 may include a valve for adjusting the amount of cooling air flow flowing out from the high temperature region 17 through each of the ventilation holes 19 and the central discharge hole 20. FIG. 15 and FIG. 16 are cross-sectional views of the battery module according to Embodiment 2. FIG. 15 is a cross-sectional view taken along line A-A of the battery module 10 illustrated in FIG. 1, and FIG. 16 is a cross-sectional view taken along line B-B of the battery module 10 illustrated in FIG. 1. In the same manner as in FIG. 10 and FIG. 11, the central discharge hole 20 is provided in the housing 11.

Figure 17:
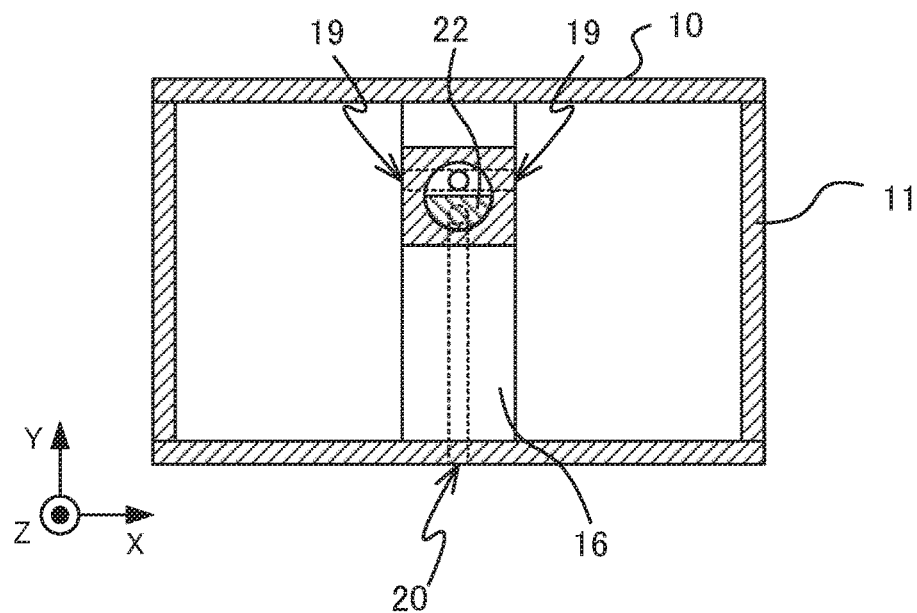
FIG. 17 is a drawing illustrating a different example of the structure of the valve according to Embodiment 2.
Figure 18:
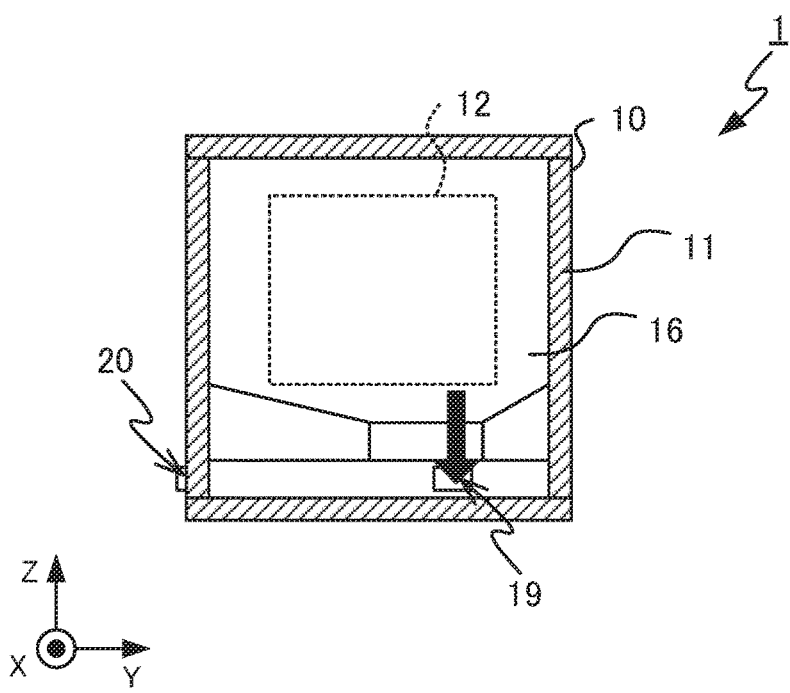
FIG. 18 is a drawing illustrating cooling air flow in the battery module according to Embodiment 2.

FIG. 17 is a drawing illustrating another example of the structure of the valve according to Embodiment 2. FIG. 17 is a cross-sectional view taken along line D-D of the battery module 10 illustrated in FIG. 15. A valve 22 adjusts the amount of cooling air flow flowing out from the high temperature region 17 through each of the ventilation holes 19 and the central discharge hole 20. Shape of the valve 22 in the X-Y cross section is semi-circular, and the valve 22 rotates around an axis in the Z axis direction. A portion or the entire flow route entrance of at least one of the ventilation holes 19 or the central discharge hole 20 can be blocked. FIG. 18 is a drawing illustrating cooling air flow in the battery module according to Embodiment 2. In the cross-sectional view of the battery module 10 illustrated in FIG. 17, the black arrow indicates the cooling air flow. In the case in which the valve 22 is positioned as illustrated in FIG. 17, all of the cooling air flow supplied to the high temperature region 17 flows between the battery cells 12, and enters the low temperature region 18 through the ventilation holes 19.

Figure 19:
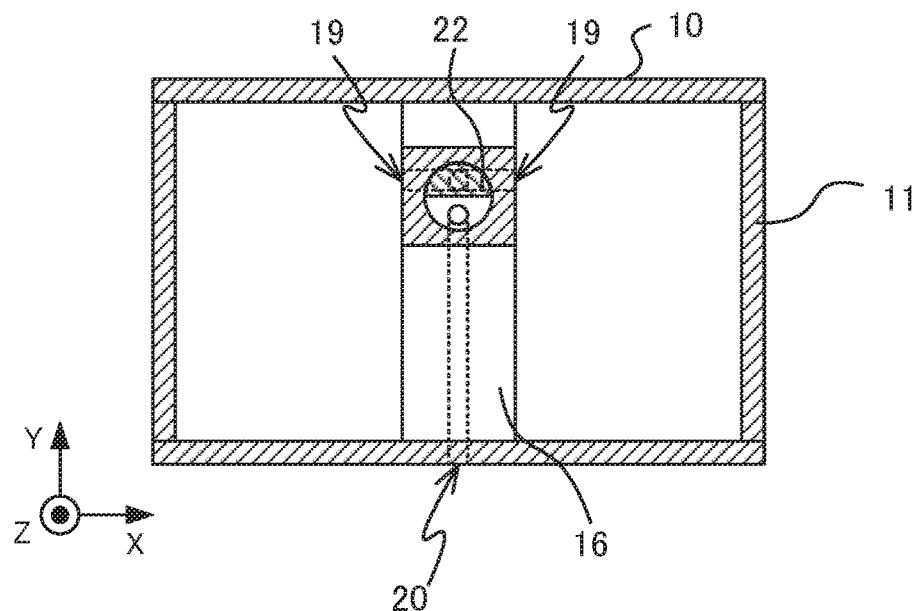
FIG. 19 is a drawing illustrating another example of the structure of the valve according to Embodiment 2.
Figure 20:
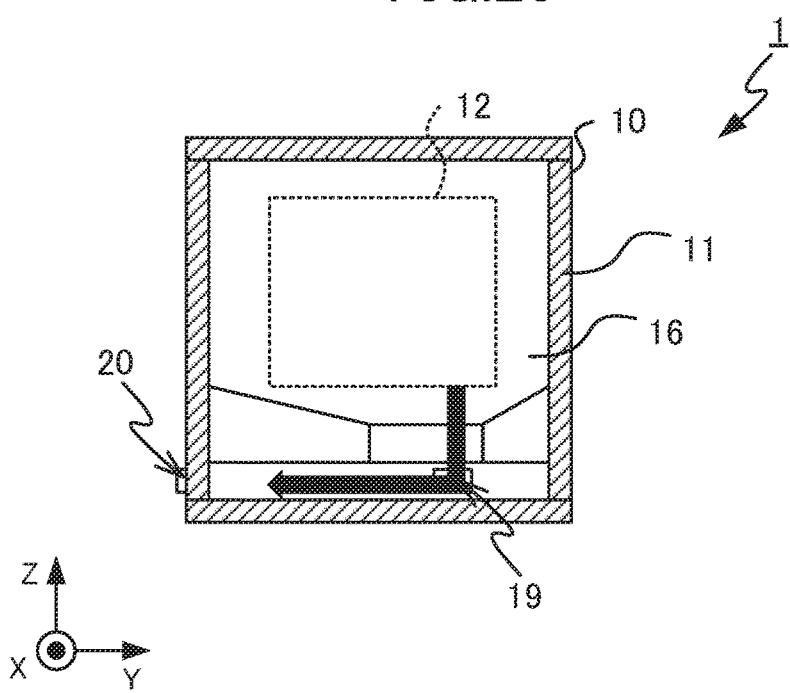
FIG. 20 is a drawing illustrating cooling air flow in the battery module according to Embodiment 2.

FIG. 19 is a drawing illustrating another example of the structure of the valve according to Embodiment 2. Upon rotation by 180 degrees, the valve 22 illustrated in FIG. 17 moves to the position illustrated in FIG. 19. FIG. 20 is a drawing illustrating cooling air flow in the battery module according to Embodiment 2. In FIG. 20, the black arrow indicates the cooling air flow in the cross-sectional view of the battery module 10. In the case in which the valve 22 is at the position illustrated in FIG. 19, all of the cooling air flow supplied to the high temperature region 17 passes between the battery cells 12, and flows out to the exterior of the housing 11 through the central discharge hole 20.

Figure 21:
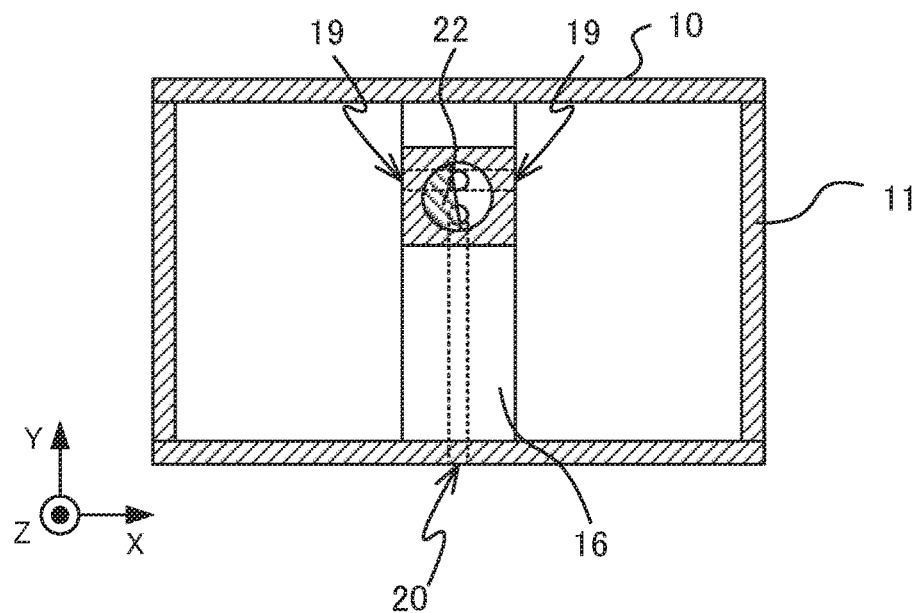
FIG. 21 is a drawing illustrating another example of the structure of the valve according to Embodiment 2.
Figure 22:
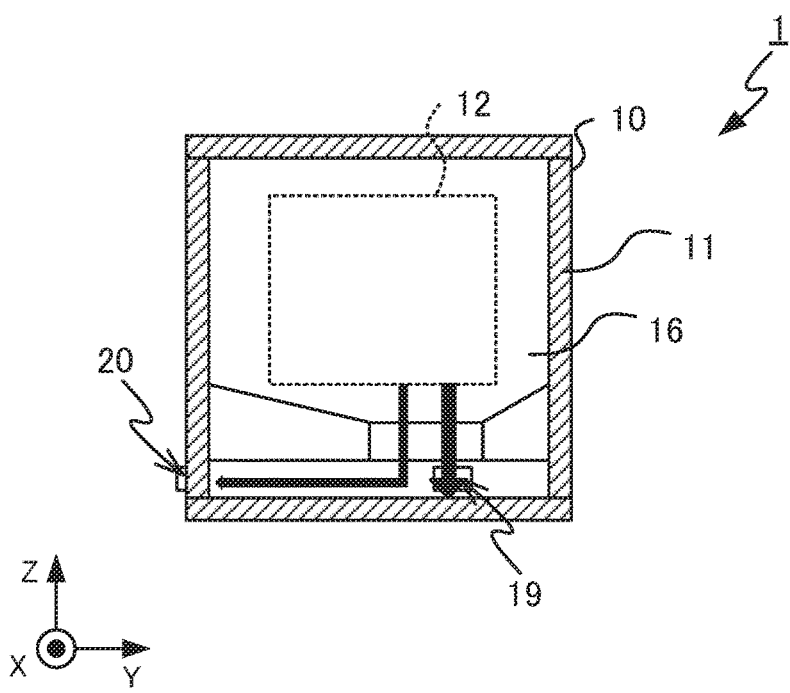
FIG. 22 is a drawing illustrating cooling air flow in the battery module according to Embodiment 2.

FIG. 21 is a drawing illustrating another example of the structure of the valve according to Embodiment 2. FIG. 22 is a drawing illustrating cooling air flow in the battery module according to Embodiment 2. In FIG. 22, the black arrows indicate the cooling air flow in the cross-sectional view of the battery module 10. In the case in which the valve 22 is at the position illustrated in FIG. 21, a large portion of the cooling air flow supplied to the high temperature region 17 passes between the battery cells 12, and enters the low temperature region 18 through the ventilation holes 19, and a portion of the cooling air flow passes between the battery cells 12, and flows out to the exterior of the housing 11 through the central discharge hole 20.

Figure 23:
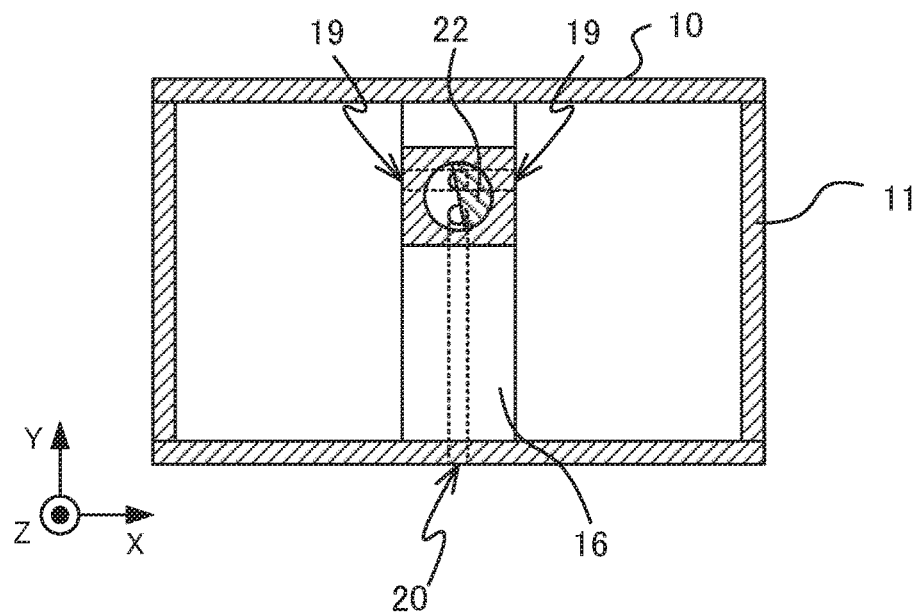
FIG. 23 is a drawing illustrating another example of the structure of the valve according to Embodiment 2.
Figure 24:
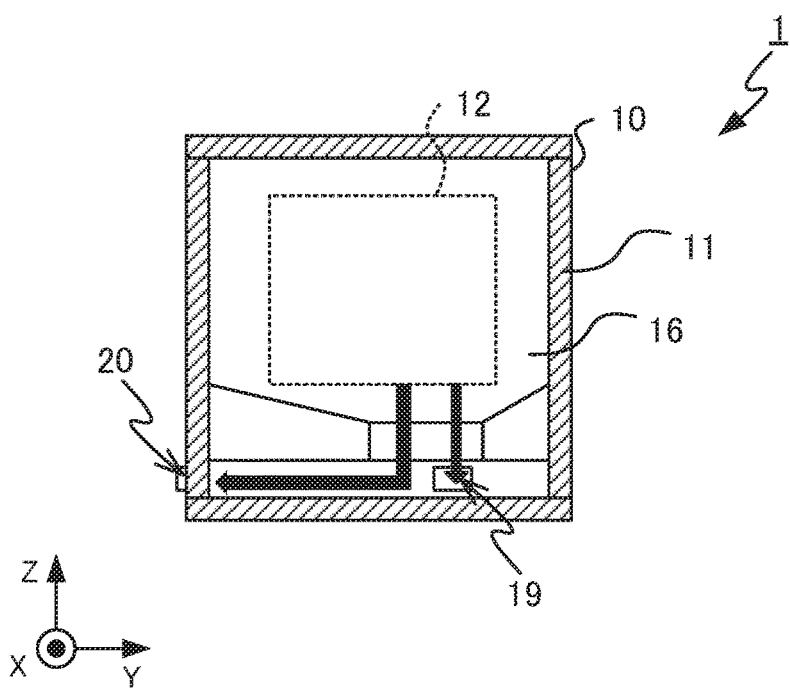
FIG. 24 is a drawing illustrating cooling air flow in the battery module according to Embodiment 2.

FIG. 23 is a drawing illustrating another example of the structure of the valve according to Embodiment 2. FIG. 24 is a drawing illustrating cooling air flow in the battery module according to Embodiment 2. In FIG. 24, the black arrows indicate the cooling air flow in the cross-sectional view of the battery module 10. In the case in which the valve 22 is at the position illustrated in FIG. 23, a large portion of the cooling air flow supplied to the high temperature region 17 passes between the battery cells 12, and flows out to the exterior of the housing 11 through the central discharge hole 20, and a portion of the cooling air flow passes between the battery cells 12, and enters the low temperature region 18 through the ventilation holes 19.

Figure 25:
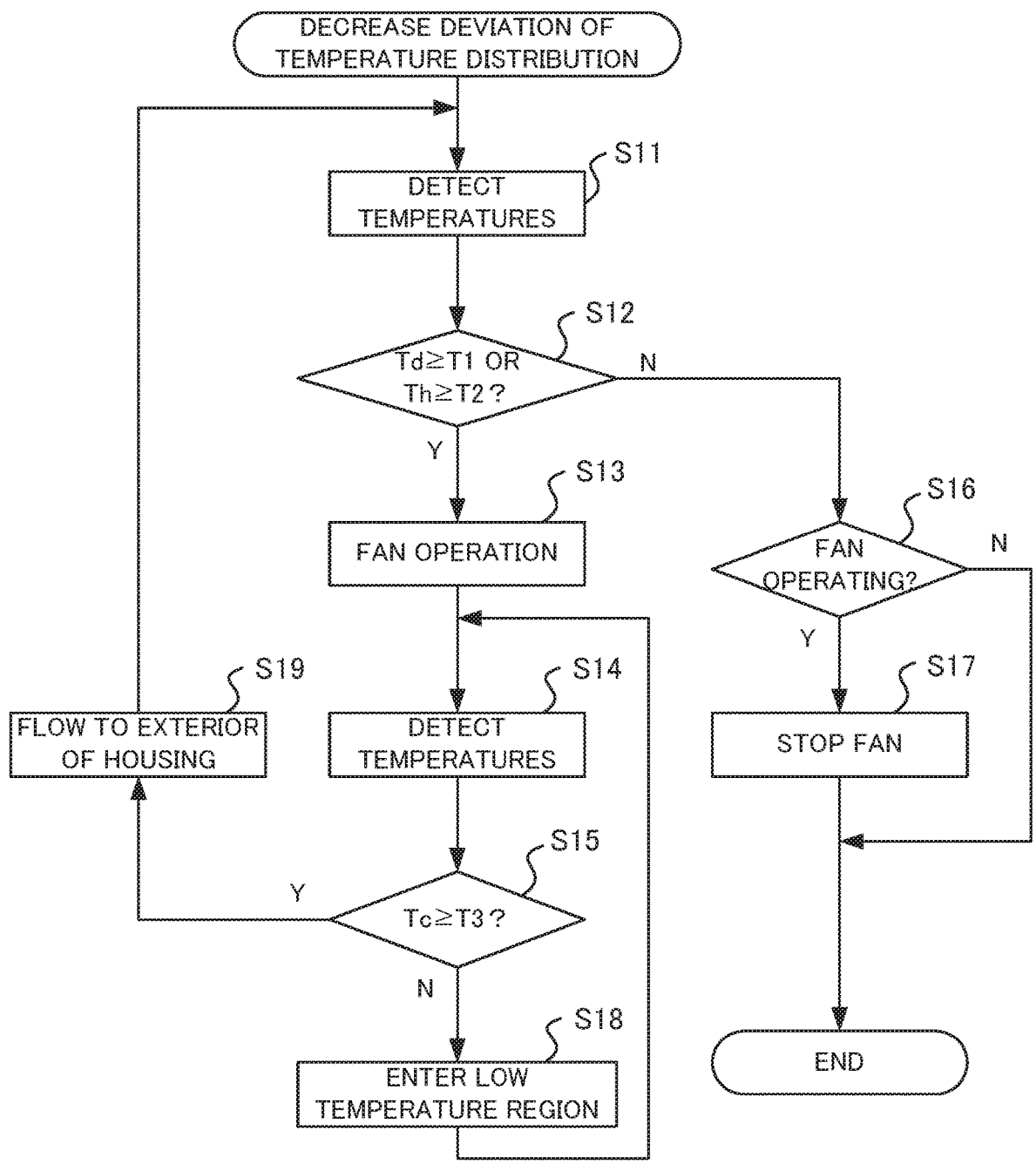
FIG. 25 is a flow chart illustrating an example of operation, performed by the power storage device according to Embodiment 2, to decrease deviation of the temperature distribution.

The operation performed by the power storage device 1 to decrease the deviation of the temperature distribution is described below in the case in which the valve 21 illustrated in FIG. 12 and FIG. 13 is provided for the battery module 10. FIG. 25 is a flow chart illustrating an example of the operation, performed by the power storage device according to Embodiment 2, to decrease the deviation of the temperature distribution. The processing of steps S11 to S17 is the same as in the operation performed by the power storage device 1 according to Embodiment 1 illustrated in FIG. 7. In the case in which Tc is not greater than or equal to T3 (N in step S15), the adjuster 3 controls the valve 21 at the position illustrated in FIG. 12, causes the cooling air flow to enter the low temperature region 18 from the high temperature region 17 (step S18), returns to step S14, and repeats the aforementioned processing. After continuation of operation of the fan 13 and causing the cooling air flow to enter the low temperature region 18 from the high temperature region 17, in the case in which Tc is greater than or equal to T3 (Y in step S15), the adjuster 3 controls the valve 21 at the position illustrated in FIG. 13, causes cooling air flow to flow from the high temperature region 17 and flow to the exterior of the housing 11 (step S19), returns to step S11, detects the temperature, and performs the determination processing of step S12.

As described above, the power storage device 1 according to Embodiment 2 enables further decrease of the deviation of the temperature distribution of the battery cells 12 in the battery module 10 by adjusting the amount of the cooling air flow passing through the high temperature region 17 and entering the low temperature region 18.

Embodiment 3

Figure 26:
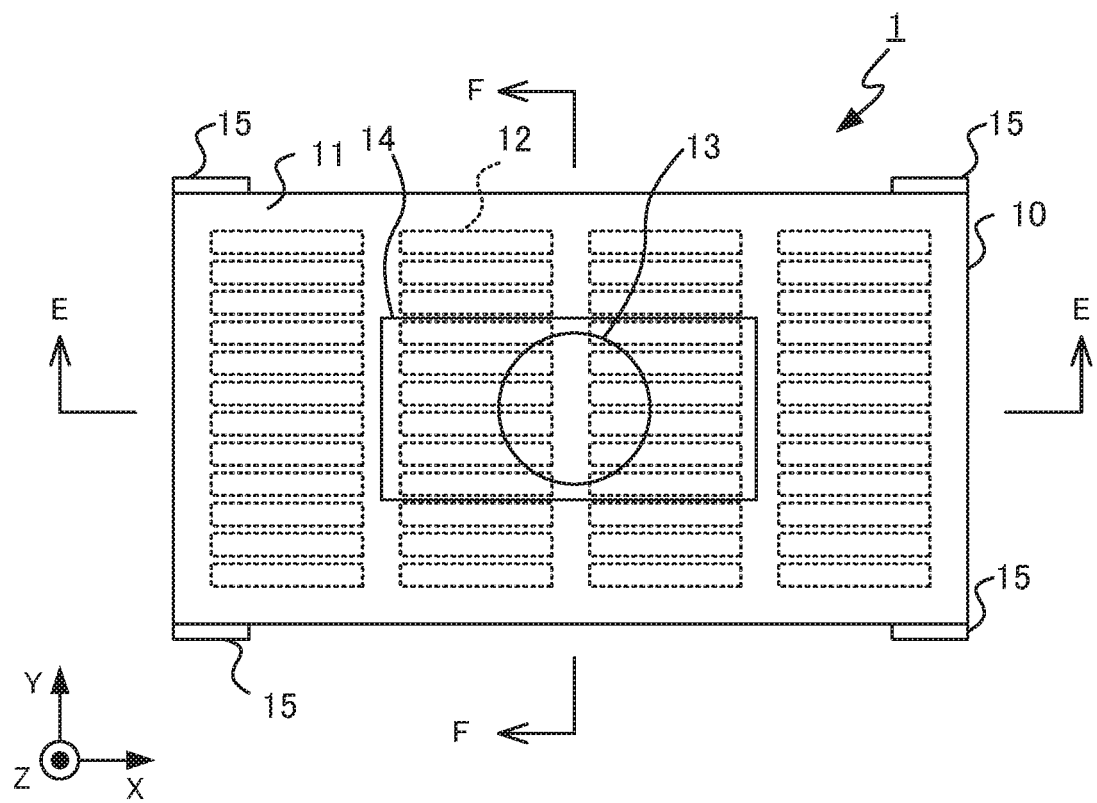
FIG. 26 is a top view of a battery module according to Embodiment 3 of the present disclosure.
Figure 27:
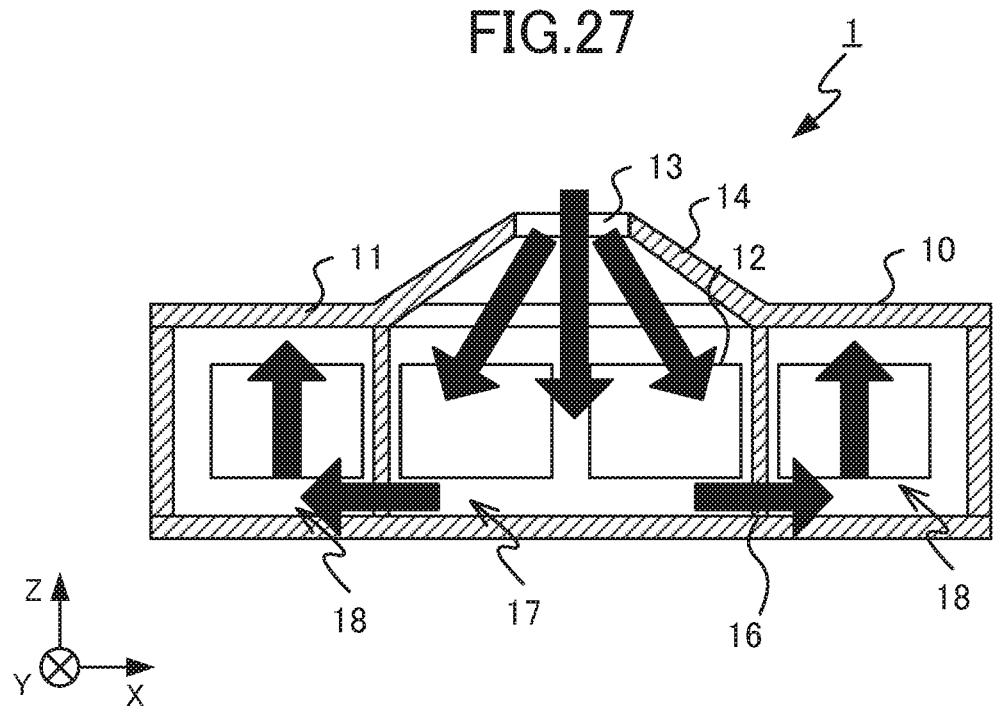
FIG. 27 is a cross-sectional view of the battery module according to Embodiment 3.
Figure 28:
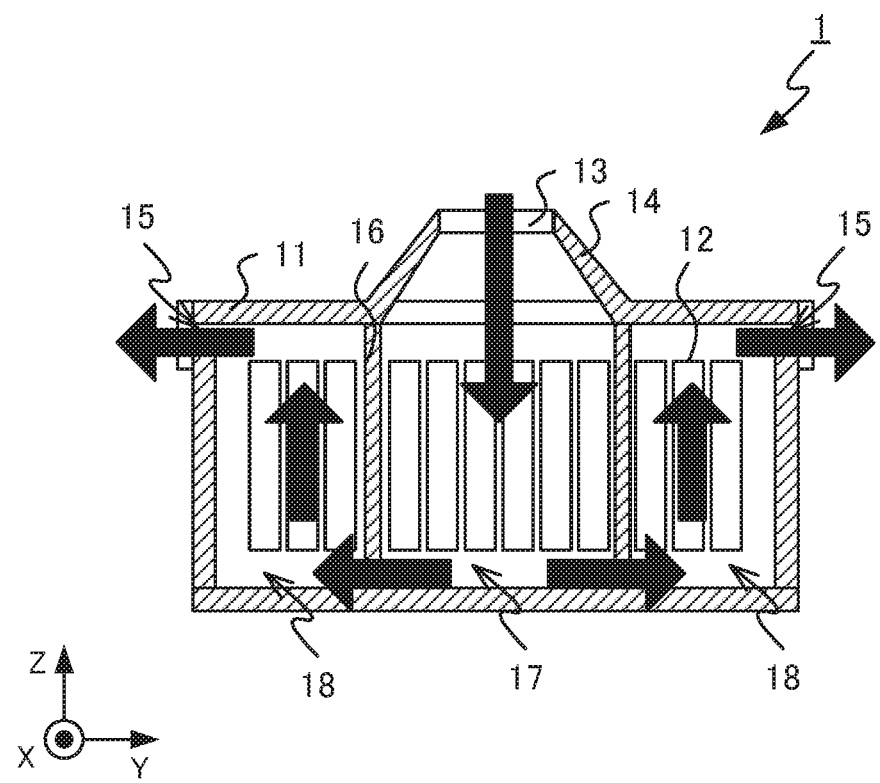
FIG. 28 is a cross-sectional view of the battery module according to Embodiment 3.

Although the battery cells 12 are disposed along the X axis direction in Embodiments 1 and 2, the direction of disposal of the battery cells 12 is not limited to a single direction. FIG. 26 is a top view of a battery module according to Embodiment 3 of the present disclosure. FIG. 27 and FIG. 28 are cross-sectional views of the battery module according to Embodiment 3. FIG. 27 is a cross-sectional view taken along line E-E of the battery module 10 illustrated in FIG. 26, and FIG. 28 is a cross-sectional view taken along line F-F of the battery module 10 illustrated in FIG. 26. In Embodiment 3, the battery cells 12 are disposed along the X axis direction and the Y axis direction. The partition members 16 divide a space within the housing 11 into:

the high temperature region 17 containing, among the battery cells 12, the battery cells 12 located centrally along the X axis direction and centrally along the Y axis direction; and the low temperature region 18 containing, among the battery cells 12, the battery cells 12 located at the end portions in the X axis direction and the battery cells 12 located at the end portions in the Y axis direction.

In the same manner as in Embodiment 1, two ventilation holes 19 are provided in each surface of the partition members 16, and are provided in the partition members 16 at positions in the vicinity of the bottom surface of the housing 11. In Embodiment 3, in the surfaces of the housing 11 perpendicular to the Y axis direction, four discharge holes 15 are provided in the vicinity of the upper surface of the housing 11 and in the vicinity of the surface of the housing 11 perpendicular to the X axis direction.

In FIG. 27 and FIG. 28, black arrows indicate the cooling air flow. Even in the case of two-dimensional disposal of the battery cells 12, in the same manner as in Embodiment 1, the cooling air flow passing from the fan 13 through the duct 14 and supplied to the high temperature region 17 passes between the battery cells 12 located within the high temperature region 17, passes through the ventilation holes 19, and enters the low temperature region 18. The cooling air flow passing through the ventilation holes 19 and entering the low temperature region 18 passes between the battery cells 12 located within the low temperature region 18, and flows out to the exterior of the housing 11 through the discharge hole 15. After exchanging heat with the battery cells 12 located within the high temperature region 17, the cooling air flow enters the low temperature region 18, and thus the temperature of the cooling air flow when entering the low temperature region 18 is higher than the temperature of the cooling air flow when supplied from the fan 13 to the high temperature region 17. Due to the cooling air flow passing through the high temperature region 17 being made to flow into the low temperature region 18, the deviation of the temperature distribution of the battery cells 12 in the battery module 10 decreases.

Figure 29:
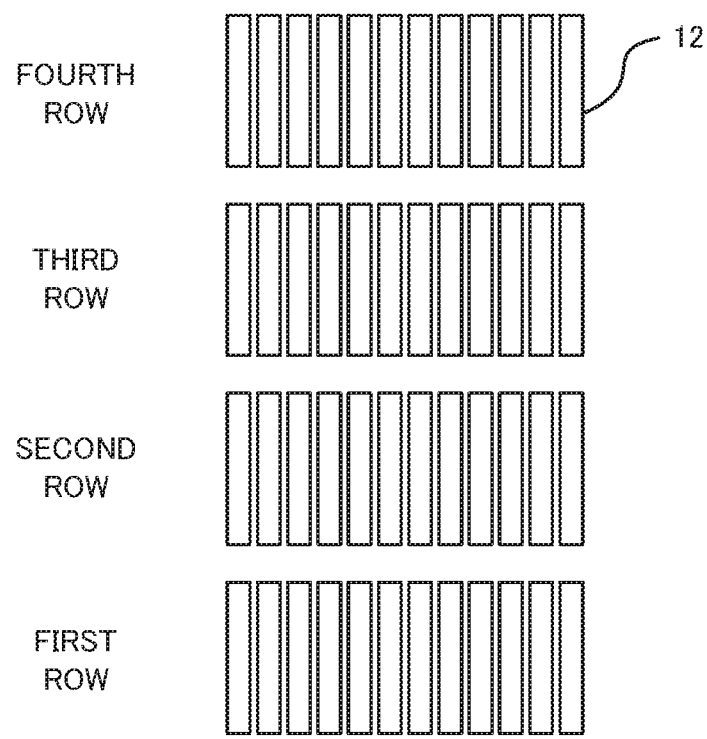
FIG. 29 is a drawing illustrating a layout example of battery cells in the battery module.
Figure 30:
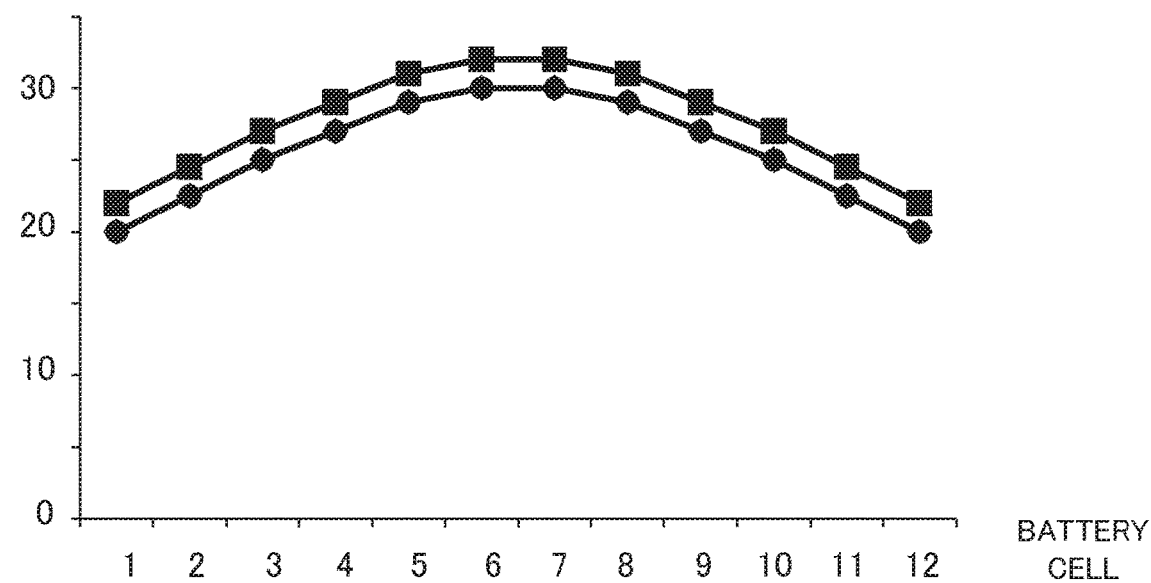
FIG. 30 is a drawing illustrating an example of temperature distribution in the battery module.
Figure 31:
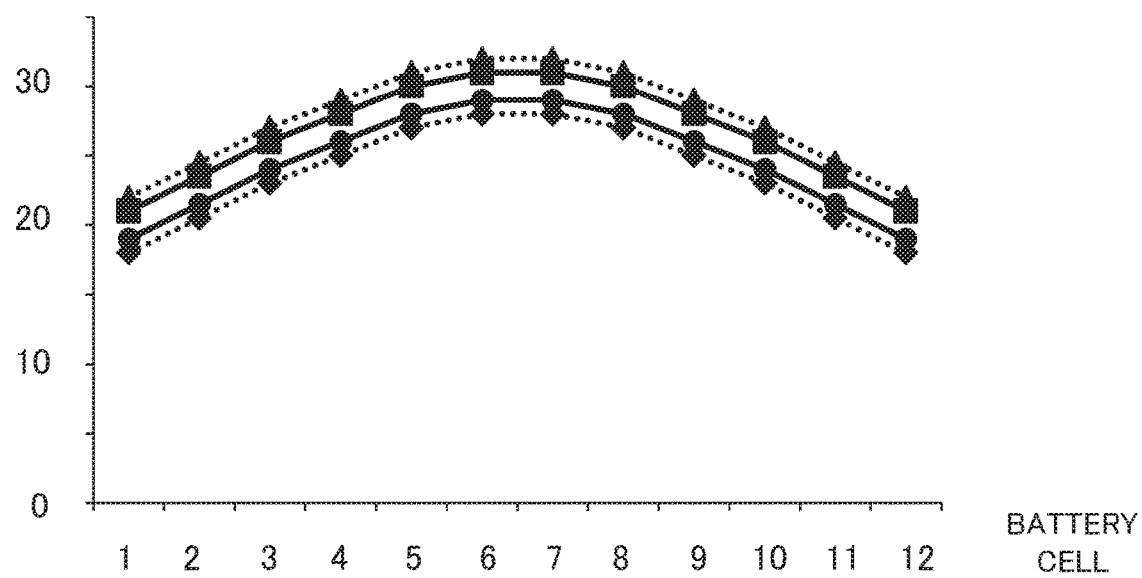
FIG. 31 is a drawing illustrating an example of temperature distribution in the battery module.
Figure 32:
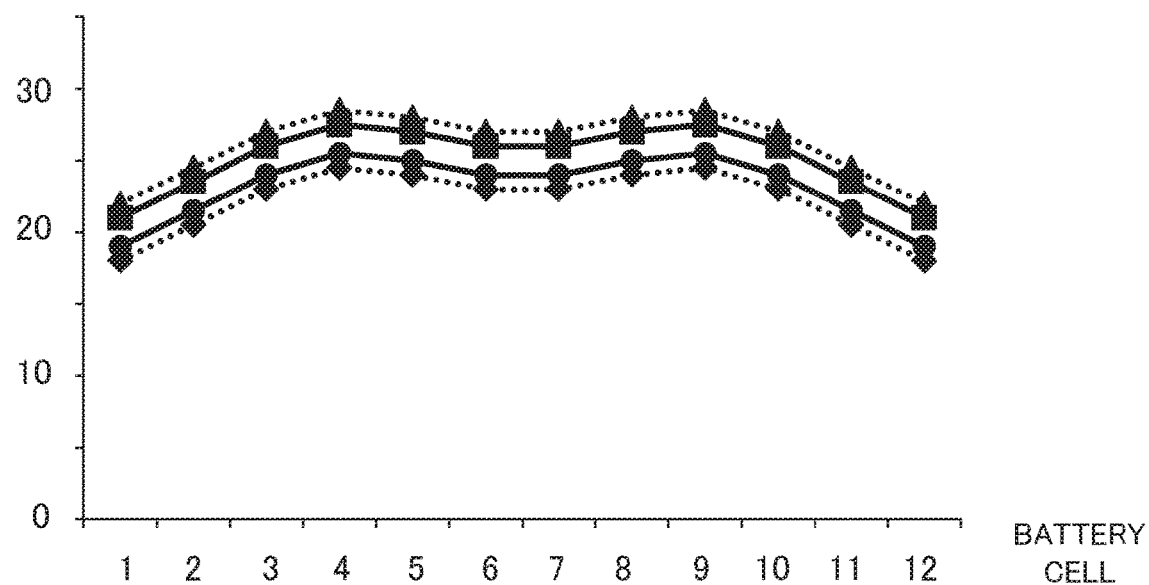
FIG. 32 is a drawing illustrating an example of temperature distribution in the battery module.
Figure 33:
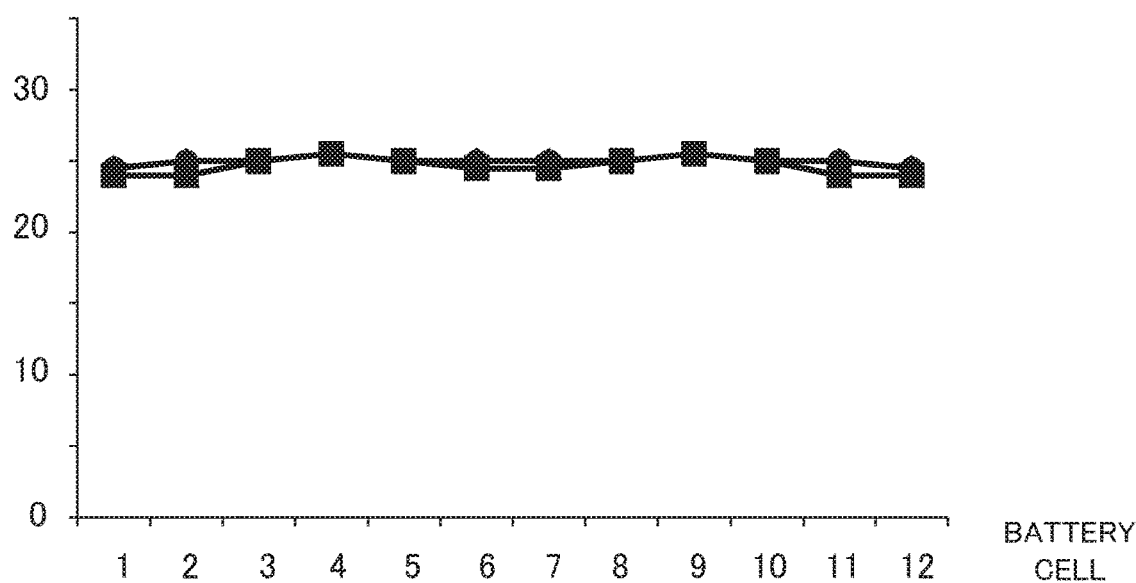
FIG. 33 is a drawing illustrating an example of temperature distribution in the battery module according to Embodiment 3.

FIG. 29 is a drawing illustrating a layout example of the battery cells in the battery module. For the battery module 10 in which 48 battery cells 12 are disposed two-dimensionally as illustrated in FIG. 29, an example is illustrated of measurement results of the temperature of the battery cells 12 when charging and discharging are repeated at a fixed current value. FIG. 30 to FIG. 32 are drawings illustrating an example of the temperature distribution of the battery module. FIG. 33 is a drawing illustrating an example of the temperature distribution of the battery module according to Embodiment 3. In FIG. 30 to FIG. 33, each battery cell 12 is indicated along the horizontal axis, and the vertical axis indicates the temperature of the battery cells 12. The values of the horizontal axis of FIG. 30 to FIG. 33 indicate the location of the battery cells 12 in each of the rows illustrated in FIG. 29, in order from the left end. That is to say, the battery cell 12 farthest to the left end in each of the rows of the battery cells 12 illustrated in FIG. 29 corresponds to "1" on the horizontal axis in FIG. 30 to FIG. 33.

FIG. 30 illustrates the temperature distribution of the battery module 10 in the case of natural cooling of the battery module 10. In FIG. 30, the temperatures of the battery cells 12 of the first row in FIG. 29 are plotted as a dotted line using diamond-shaped points, the temperatures of the battery cells 12 of the second row in FIG. 29 are plotted as a solid line using square-shaped points, the temperatures of the battery cells 12 of the third row of FIG. 29 are plotted as a dotted line using triangle-shaped points, and the temperatures of the battery cells 12 of the fourth row of FIG. 29 are plotted as a solid line using round-shaped points. The temperatures of the battery cells 12 of the first row and the temperatures of the battery cells 12 of the fourth row were nearly the same, and the temperatures of the battery cells 12 of the second row and the temperatures of the battery cells 12 of the third row were nearly the same. In each of the rows, the temperatures of the battery cells 12 located centrally in the row were higher than the temperatures of the battery cells 12 located at the end portions of the row, and the temperatures of the battery cells 12 in the second row and the third row were higher than temperatures of the battery cells 12 at the same locations in the first row and the fourth row. The temperatures of the battery cells 12 located centrally in the battery module 10 are understood to have been higher than the temperatures of the battery cells 12 located at the end portions.

FIG. 31 illustrates the temperature distribution of the battery module 10 in the case in which cooling air flow was uniformly supplied to the each battery cell 12 in the first row in such a manner that the cooling air flows from the first row toward the fourth row. This figure is to be read in the same manner as FIG. 30. Although the temperatures of the first row of the battery cells 12 decreased, the generated deviation of the temperature distribution was maintained.

FIG. 32 illustrates the temperature distribution of the battery module 10 in the case in which cooling air flow was supplied to a portion of the battery cells 12 located centrally in the first row in such a manner that the cooling air flow flows from the first row toward the fourth row. This figure is to be read in the same manner as FIG. 30. Although the temperatures of the battery cells 12 located centrally in each row decreased, in each row, a temperature difference occurred between the battery cells 12 located between the center and the end portions and the battery cells 12 located at the end portions.

FIG. 33 illustrates the temperature distribution in a battery module according to Embodiment 3. In the power storage device 1 according to Embodiment 3, the deviation of the temperature distribution of the battery cells 12 occurring in the battery module 10 is understood to have been decreased by the cooling air flow supplied from the fan 13 passing through the high temperature region 17 and then entering the low temperature region 18.

As described above, the power storage device 1 according to Embodiment 3 enabled further decrease of the deviation of the temperature distribution of the battery cells 12 in the battery module 10 in which the battery cells 12 are disposed two dimensionally, by causing the cooling air flow passing through the high temperature region 17 to pass through the low temperature region 18 and flow to the exterior of the housing 11.

Embodiment 4

Figure 34:
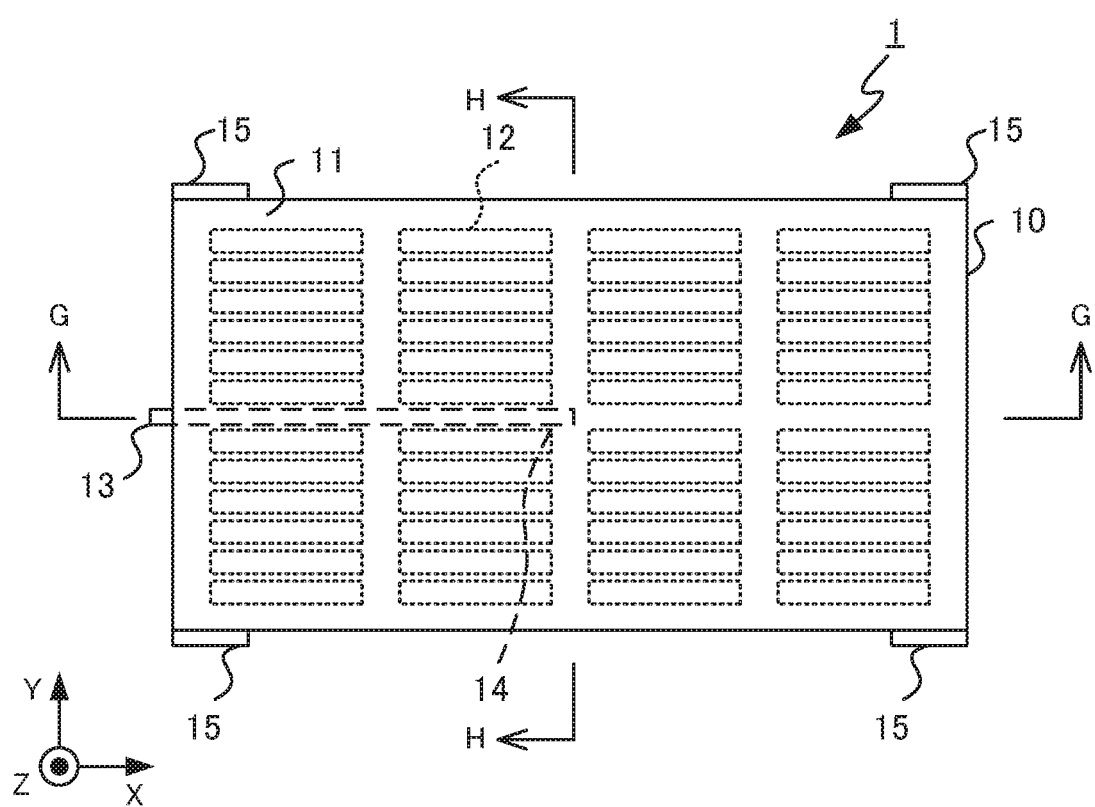
FIG. 34 is a top view of a battery module according to Embodiment 4 of the present disclosure.
Figure 35:
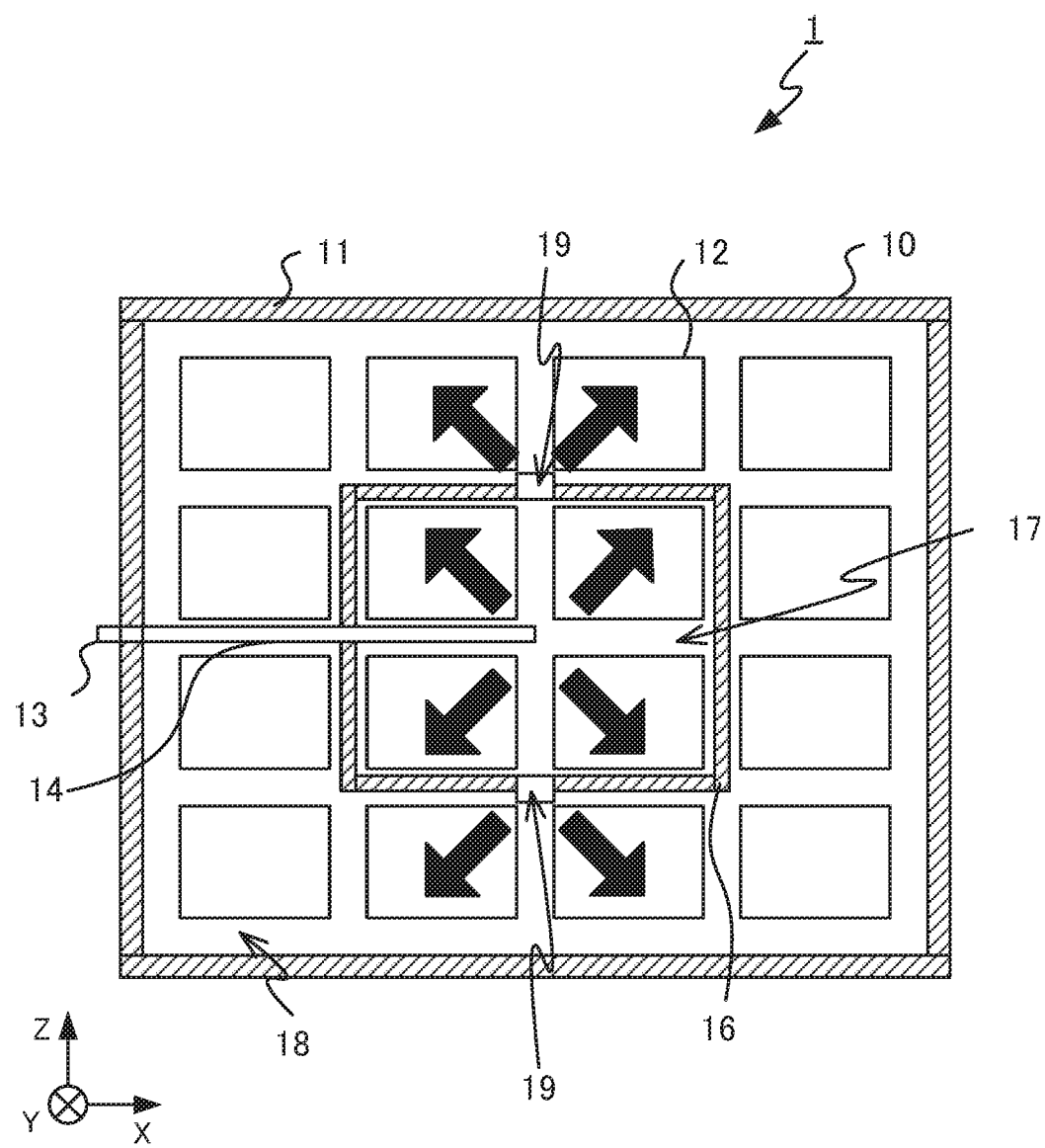
FIG. 35 is a cross-sectional view of the battery module according to Embodiment 4.
Figure 36:
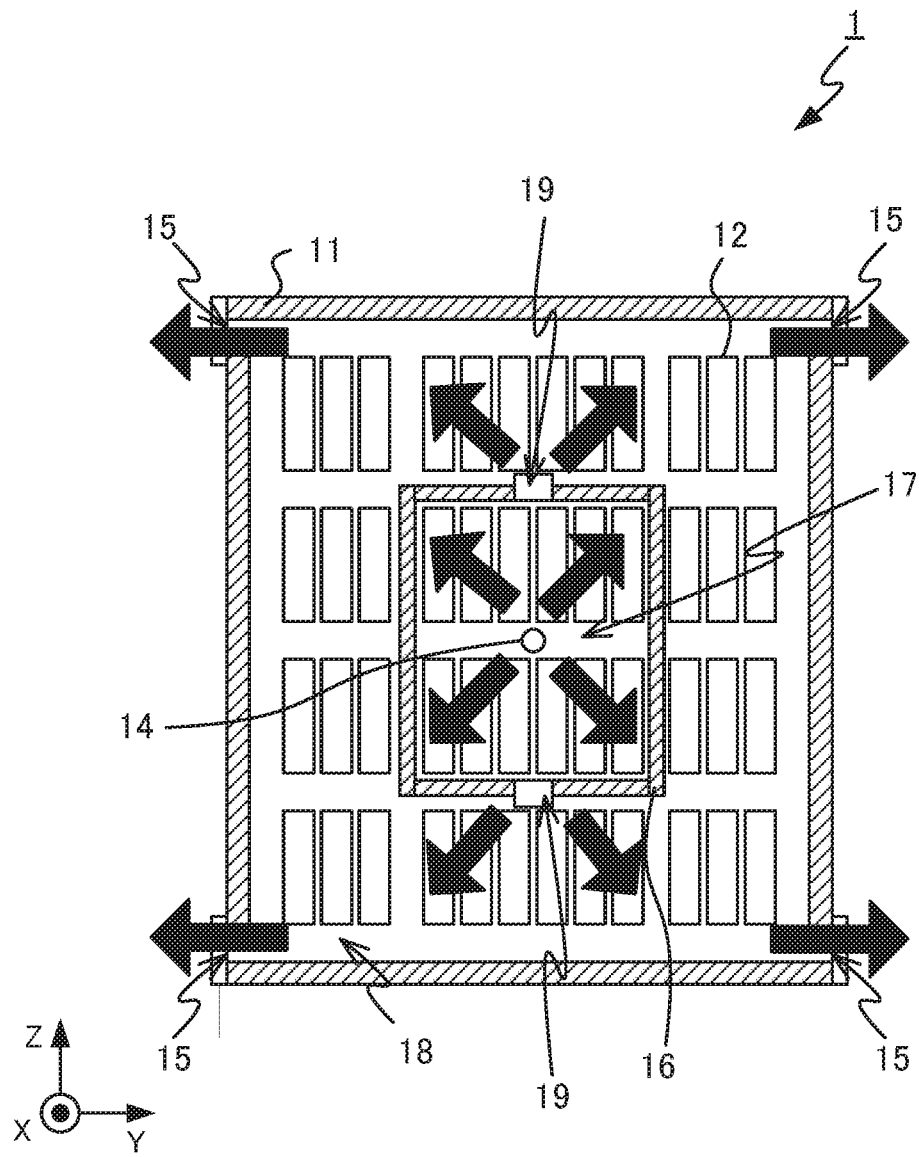
FIG. 36 is a cross-sectional view of the battery module according to Embodiment 4.

The battery cells 12 may be disposed three-dimensionally in the battery module 10. FIG. 34 is a top view of a battery module according to Embodiment 4 of the present disclosure. FIG. 35 and FIG. 36 are cross-sectional views of the battery module according to Embodiment 4. FIG. 35 is a cross-sectional view taken along line G-G of the battery module 10 illustrated in FIG. 34, and FIG. 36 is a cross-sectional view taken along line H-H of the battery module 10 illustrated in FIG. 34. In Embodiment 4, the battery cells 12 are disposed in the X axis direction, the Y axis direction, and the Z axis direction. The partition member 16 divides a space of the interior of the housing 11 into:

the high temperature region 17 including, among the battery cells 12, the battery cells 12 located centrally in the X axis direction, centrally in the Y axis direction, and centrally in the Z axis direction; and the low temperature region 18 including, among the battery cells 12, the battery cells 12 located at the end portions in the X axis direction, the battery cells 12 located at the end portions in the Y axis direction, and the battery cells 12 located at the end portions in the Z axis direction.

In Embodiment 4, ventilation holes 19 are provided at the center of the surfaces of the partition member 16 perpendicular to the Z axis. Eight discharge holes 15 are provided in the surfaces of the housing 11 perpendicular to the Y axis direction, in the vicinity of upper surface or bottom surface of the housing 11, and in the vicinity of the surface of the housing 11 perpendicular to the X axis direction.

In FIG. 35 and FIG. 36, black arrows indicate the cooling air flow. Even in the case of three dimensional disposal of the battery cells 12, in the same manner as Embodiment 1, the cooling air flow supplied to the high temperature region 17 through the duct 14 from the fan 13 passes between the battery cells 12 located in the high temperature region 17, passes through the ventilation holes 19, and enters the low temperature region 18. The cooling air flow flowing into the low temperature region 18 through the ventilation holes 19 passes between the battery cells 12 located in the low temperature region 18, and flows out to the exterior of the housing 11 through the discharge holes 15. After exchanging heat with the battery cells 12 located in the high temperature region 17, the cooling air flow enters the low temperature region 18, and thus temperature of the cooling air flow when entering the low temperature region 18 is higher than the temperature of the cooling air flow when supplied from the fan 13 to the high temperature region 17. Due to the cooling air flow passing through the high temperature region 17 being made to flow into the low temperature region 18, the deviation of the temperature distribution of the battery cells 12 in the battery module 10 decreases.

Figure 37:
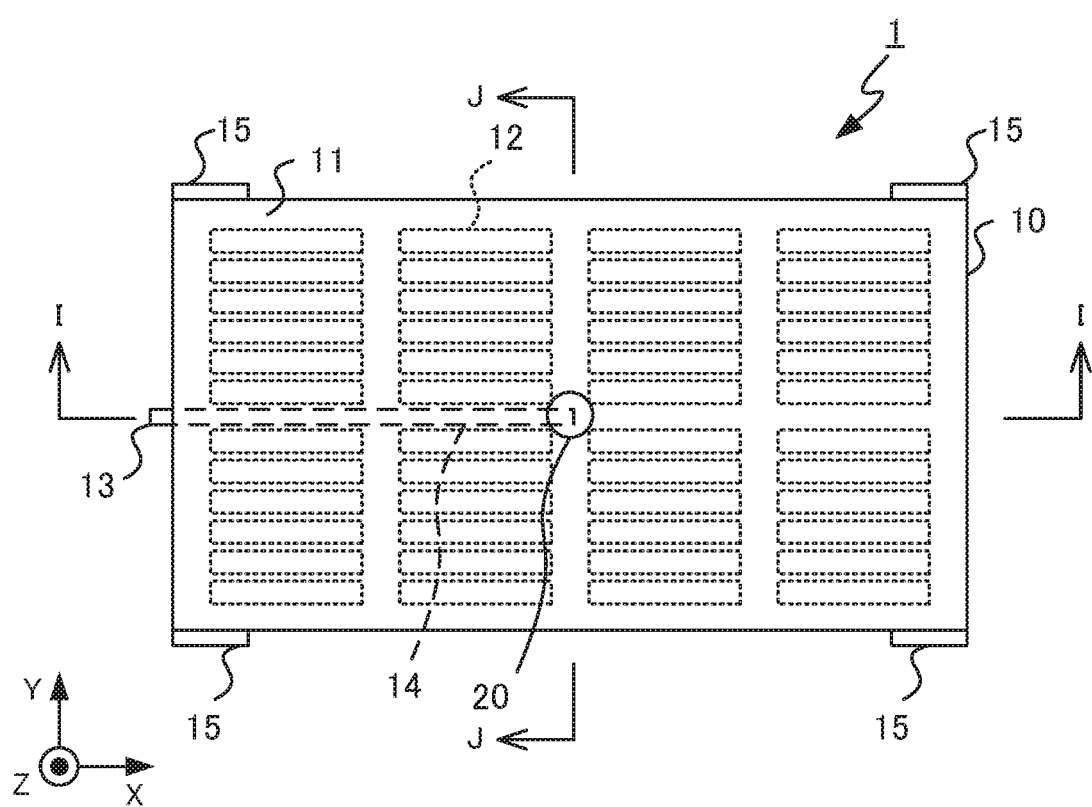
FIG. 37 is a top view of the battery module according to Embodiment 4.
Figure 38:
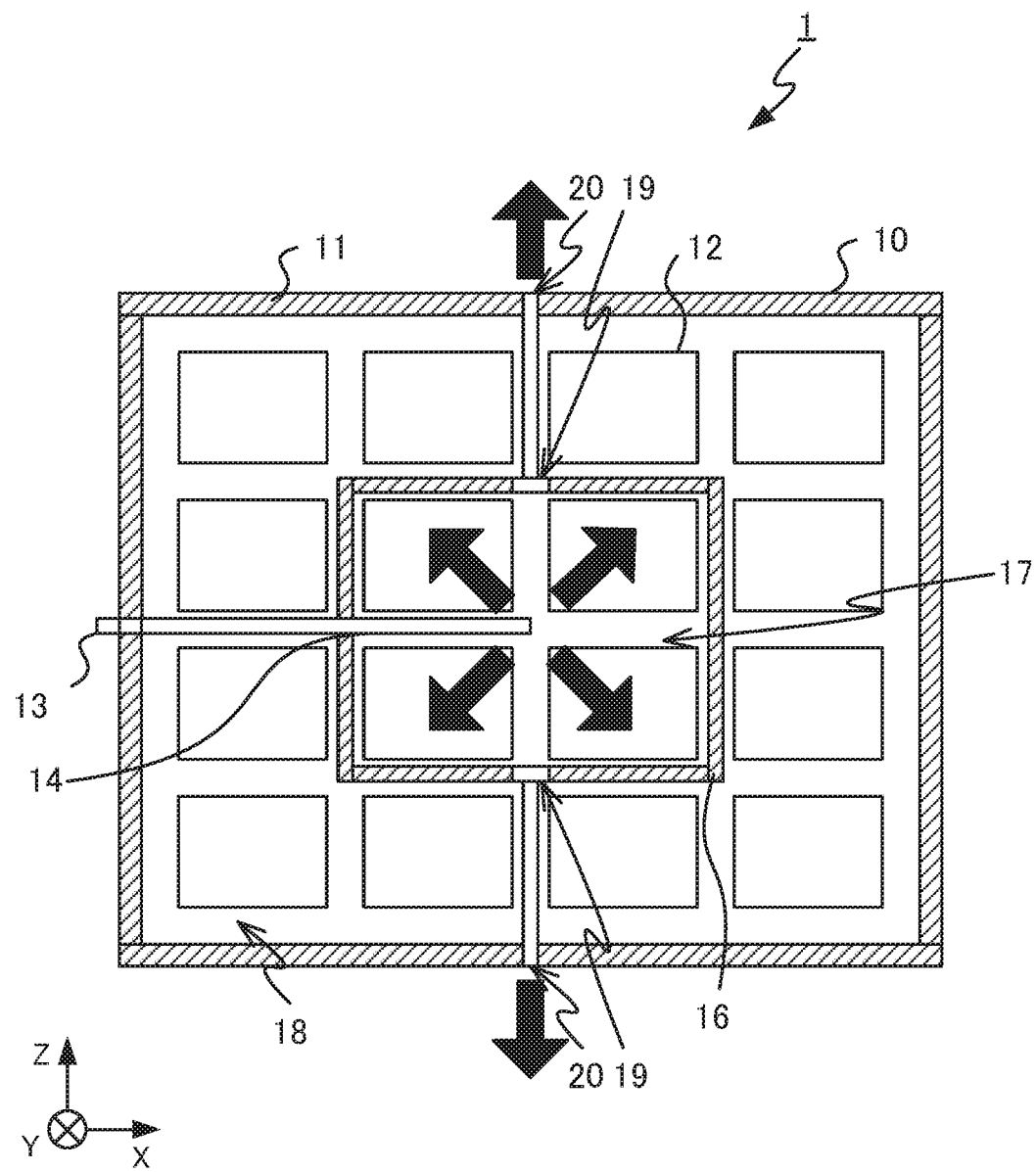
FIG. 38 is a cross-sectional view of the battery module according to Embodiment 4.
Figure 39:
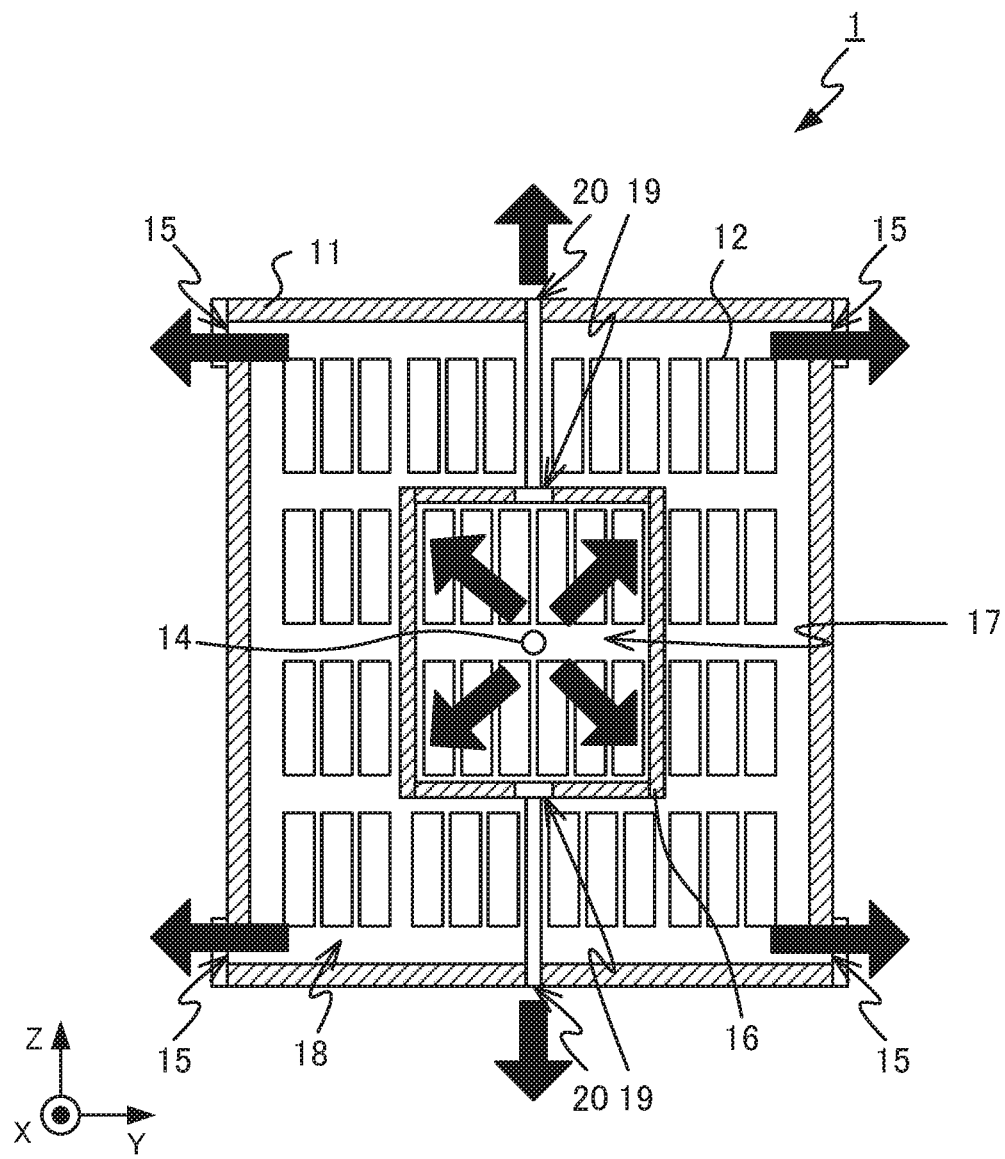
FIG. 39 is a cross-sectional view of the battery module according to Embodiment 4.

In the same manner as in Embodiment 2, the battery module 10 may be configured by providing the valve 21 or 22 so that, when Tc is greater than or equal to T3 after operation of the fan 13, the cooling air flow supplied to the high temperature region 17 passes between the battery cells 12, and then flows out to the exterior of the housing 11 through the central discharge hole 20. FIG. 37 is a top view of the battery module according to Embodiment 4. FIG. 38 and FIG. 39 are cross-sectional views of the battery module according to Embodiment 4. FIG. 38 is a cross-sectional view taken along line I-I of the battery module 10 illustrated in FIG. 37, and FIG. 39 is a cross-sectional view taken along line J-J of the battery module 10 illustrated in FIG. 37. The adjuster 3, in response to Tc, controls the valves 21 and 22 provided in the battery module 10, and adjusts the respective amount of cooling air flow passing through each of the ventilation holes 19 and the central discharge hole 20 and out from the high temperature region 17. Thus decrease of the deviation of the temperature distribution of the battery cells 12 in the battery module 10 is enabled.

As described above, the power storage device 1 according to Embodiment 4 enabled further decrease of deviation of the temperature distribution of the battery cells 12 in the battery module 10 in which the battery cells 12 are disposed three-dimensionally, by causing the cooling air flow passing through the high temperature region 17 to pass through the low temperature region 18 and flow to the exterior of the housing 11.

The embodiments of the present disclosure are not limited to the aforementioned embodiments, and configuration is possible by, among the aforementioned embodiments, combining embodiments as desired. The locations of arrangement of the discharge holes 15, the ventilation holes 19, and the central discharge hole 20 in the battery module 10 and the method of disposal of the battery cells 12 in the battery module 10 are not limited to the locations described in the aforementioned embodiments. For example, in Embodiment 4, the ventilation holes 19 may be provided centrally in each surface of the partition member 16. The method of control of the fan 13 is not limited to the aforementioned embodiments, and any desired method may be used that decreases the deviation of the temperature distribution. For example, the fan 13 may be made to operate when Td is greater than or equal to T1 or Th is greater than or equal to T2, without operation depending on Tc.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Power storage device
2 Power controller
3 Adjuster
4 Current detector
5 Voltage detector
6 Temperature determiner
10 Battery module
11 Housing
12 Battery cell
13 Fan
14 Duct
15 Discharge hole
16 Partition member
17 High temperature region
18 Low temperature region
19 Ventilation hole
20 Central discharge hole
21, 22 Valve

The invention claimed is:

1. A power storage device comprising:
a battery module including:
  a housing,
  battery cells disposed apart from each other within the housing, and
  a partition member dividing a space within the housing into (i) a high temperature region containing, among the battery cells, the battery cells disposed centrally in an arrangement direction, and (ii) a low temperature region containing, among the battery cells, the battery cells disposed in end portions in the arrangement direction;
a fan to supply a cooling air flow to the high temperature region; and
an adjuster to adjust an amount of the cooling air flow by controlling the fan in response to a value indicating a degree of deviation of a temperature distribution of the battery cells,
wherein the partition member has a ventilation hole to allow the cooling air flow supplied from the fan to the high temperature region to pass between the battery cells contained in the high temperature region and enter the low temperature region,
the housing has a discharge hole to allow the cooling air flow passing through the ventilation hole and entering the low temperature region to pass between the battery cells contained in the low temperature region and flow to an exterior of the housing,
the housing has a central discharge hole to allow the cooling air flow supplied from the fan to the high temperature region and passing between the battery cells contained in the high temperature region to flow to the exterior of the housing,
the power storage device further comprises a valve to adjust the amount of the cooling air flow passing through each of the ventilation hole and the central discharge hole and flowing out of the high temperature region, and
the adjuster controls the valve in response to a value corresponding to a minimum temperature of the battery cells.

2. The power storage device according to claim 1, wherein the adjuster is configured to:
(i) cause the fan to operate when the value indicating the degree of deviation of the temperature distribution of the battery cells is greater than or equal to a first threshold, or when a value corresponding to a maximum temperature of the battery cells is greater than or equal to a second threshold,
(ii) after operation of the fan, control the valve in response to the value corresponding to the minimum temperature of the battery cells, and
(iii) stop the fan when a value corresponding to the minimum temperature of the battery cells is greater than or equal to a third threshold, the value indicating the degree of deviation of the temperature distribution of the battery cells is less than the first threshold, and the value corresponding to the maximum temperature of the battery cells is less than the second threshold.

3. A power storage device comprising:
a housing;
battery cells disposed apart from each other within the housing;
a partition member dividing a space within the housing into (i) a high temperature region containing, among the battery cells, the battery cells disposed centrally in an arrangement direction, and (ii) a low temperature region containing, among the battery cells, the battery cells disposed in end portions in the arrangement direction;
a fan to supply a cooling air flow to the high temperature region; and
an adjuster to adjust an amount of the cooling air flow by controlling the fan in response to a value indicating a degree of deviation of a temperature distribution of the battery cells,
wherein the partition member has a ventilation hole to allow the cooling air flow supplied from the fan to the high temperature region to pass between the battery cells contained in the high temperature region and enter the low temperature region,
the housing has a discharge hole to allow the cooling air flow passing through the ventilation hole and entering the low temperature region to pass between the battery cells contained in the low temperature region and to flow to an exterior of the housing, and the adjuster is configured to:
(i) cause the fan to operate when the value indicating the degree of deviation of the temperature distribution of the battery cells is greater than or equal to a first threshold, or when a value corresponding to a maximum temperature of the battery cells is greater than or equal to a second threshold,
(ii) cause the operation of the fan to continue while a value corresponding to a minimum temperature of the battery cells is less than a third threshold, and
(iii) stop the fan after operation of the fan, when the value corresponding to the minimum temperature of the battery cells is greater than or equal to the third threshold, the value indicating the degree of deviation of the temperature distribution of the battery cells is less than the first threshold, and the value corresponding to the maximum temperature of the battery cells is less than the second threshold.

4. The power storage device according to claim 3, wherein the adjuster is configured to control the fan based on:
the first threshold being determined in response to (i) a permissible range of a difference in resistance values in the battery cells on the basis of a relationship between a temperature and an internal resistance of the battery cells, or (ii) a relationship between the temperature of the battery cells and a service life of the battery cells,
the second threshold being determined in response to a second temperature at which the battery cells are deteriorable due to, when the temperature of the battery cells is greater than or equal to the second temperature, occurrence of side reactions that are not normal reactions desired for the battery cells to function as the battery cells, and
the third threshold being determined in response to a third temperature at which a collective input-output performance desired for the battery cells, from the relationship between the temperature and the internal resistance of the battery cells, is achievable when the temperature of the battery cells is greater than or equal to the third temperature.

5. The power storage device according to claim 3, further comprising:
a temperature determiner to measure temperatures of the battery cells,
wherein the adjuster calculates the value indicating the degree of deviation of the temperature distribution of the battery cells based on the temperatures of the battery cells measured by the temperature determiner.

6. The power storage device according to claim 4, further comprising:
a temperature determiner to measure temperatures of the battery cells,
wherein the adjuster calculates the value indicating the degree of deviation of the temperature distribution of the battery cells based on the temperatures of the battery cells measured by the temperature determiner.

7. The power storage device according to claim 3, further comprising:
an internal resistance calculator to calculate internal resistances of the battery cells based on voltages of the battery cells and current flowing through the battery cells; and
a temperature estimator to estimate the temperatures of the battery cells based on (i) a predetermined relationship between the internal resistances and the temperatures, and (ii) the internal resistances calculated by the internal resistance calculator,
wherein the adjuster calculates the value indicating the degree of deviation of the temperature distribution based on the temperatures of the battery cells estimated by the temperature estimator.

8. The power storage device according to claim 4, further comprising:
an internal resistance calculator to calculate internal resistances of the battery cells based on voltages of the battery cells and current flowing through the battery cells; and
a temperature estimator to estimate the temperatures of the battery cells based on (i) a predetermined relationship between the internal resistances and the temperatures, and (ii) the internal resistances calculated by the internal resistance calculator,
wherein the adjuster calculates the value indicating the degree of deviation of the temperature distribution based on the temperatures of the battery cells estimated by the temperature estimator.

9. The power storage device according to claim 3, wherein the value indicating the degree of deviation of the temperature distribution is determined by temperatures of, among the battery cells, a portion of the battery cells contained in the high temperature region and a portion of the battery cells contained in the low temperature region, the portion of the battery cells contained in the high temperature region and the portion of the battery cells contained in the low temperature region being determined in accordance with the temperature distribution of the battery cells when the fan is not operated.

10. The power storage device according to claim 4, wherein the value indicating the degree of deviation of the temperature distribution is determined by temperatures of, among the battery cells, a portion of the battery cells contained in the high temperature region and a portion of the battery cells contained in the low temperature region, the portion of the battery cells contained in the high temperature region and the portion of the battery cells contained in the low temperature region being determined in accordance with the temperature distribution of the battery cells when the fan is not operated.

* * * * *